United States Patent
Benson et al.

(10) Patent No.: US 11,649,310 B2
(45) Date of Patent: *May 16, 2023

(54) COPOLYMERS AND THE USE OF SAME IN CLEANING AGENT COMPOSITIONS

(71) Applicant: Clariant International Ltd., Muttenz (CH)

(72) Inventors: Hannah Benson, Bensheim (DE); Carsten Cohrs, Frankfurt am Main (DE); Mike Sahl, Bad Camberg (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 81 days.

This patent is subject to a terminal disclaimer.

(21) Appl. No.: 16/463,825

(22) PCT Filed: Nov. 21, 2017

(86) PCT No.: PCT/EP2017/079948
§ 371 (c)(1),
(2) Date: May 23, 2019

(87) PCT Pub. No.: WO2018/095918
PCT Pub. Date: May 31, 2018

(65) Prior Publication Data
US 2019/0382686 A1 Dec. 19, 2019

(30) Foreign Application Priority Data

Nov. 28, 2016 (DE) .......................... 102016223588.5

(51) Int. Cl.
| | | |
|---|---|---|
| *B08B 3/04* | (2006.01) | |
| *C11D 3/37* | (2006.01) | |
| *C08F 220/28* | (2006.01) | |
| *C08F 220/34* | (2006.01) | |
| *C08F 220/54* | (2006.01) | |
| *C08F 220/56* | (2006.01) | |
| *C08F 226/04* | (2006.01) | |
| *B08B 3/08* | (2006.01) | |
| *C08F 236/14* | (2006.01) | |
| *C11D 3/00* | (2006.01) | |
| *C11D 11/00* | (2006.01) | |

(52) U.S. Cl.
CPC .............. *C08F 220/54* (2013.01); *B08B 3/08* (2013.01); *C08F 220/56* (2013.01); *C08F 236/14* (2013.01); *C11D 3/0036* (2013.01); *C11D 3/378* (2013.01); *C11D 3/3773* (2013.01); *C11D 11/0023* (2013.01)

(58) Field of Classification Search
CPC .......... B08B 3/04; C11D 3/37; C11D 3/3707; C11D 3/3719; C11D 3/3769; C11D 11/0023; C08F 220/28; C08F 220/288; C08F 220/34; C08F 220/54; C08F 220/56; C08F 226/04; C08F 2800/10
See application file for complete search history.

(56) References Cited

U.S. PATENT DOCUMENTS

| | | |
|---|---|---|
| 2,182,306 A | 12/1939 | Ulrich |
| 2,208,095 A | 7/1940 | Esselmann |
| 2,553,696 A | 5/1951 | Wilson |
| 2,806,839 A | 9/1957 | Crowther |
| 2,809,971 A | 10/1957 | Bernstein |
| 3,033,746 A | 5/1962 | Moyle |
| 3,128,287 A | 4/1964 | Berg |
| 3,159,581 A | 12/1964 | Diehl |
| 3,213,030 A | 10/1965 | Diehl |
| 3,236,733 A | 2/1966 | Karsten |
| 3,400,148 A | 9/1968 | Quimby |
| 3,422,021 A | 1/1969 | Henry |
| 3,422,137 A | 1/1969 | Quimby |
| 3,635,830 A | 1/1972 | Roy |
| 3,753,196 A | 8/1973 | Kurtz |
| 3,761,418 A | 9/1973 | Parran |
| 3,958,581 A | 5/1976 | Abegg |
| 3,962,418 A | 6/1976 | Birkofer |
| 3,985,669 A | 10/1976 | Krummel |
| 4,009,256 A | 2/1977 | Nowak, Jr. |
| 4,323,683 A | 4/1982 | Bolich, Jr. |
| 4,345,080 A | 8/1982 | Bolich, Jr. |
| 4,379,753 A | 4/1983 | Bolich, Jr. |
| 4,470,982 A | 9/1984 | Winkler |
| 4,529,773 A | 7/1985 | Witiak |
| 4,566,984 A | 1/1986 | Bush |
| 4,605,509 A | 8/1986 | Corkill |

(Continued)

FOREIGN PATENT DOCUMENTS

| | | |
|---|---|---|
| CN | 1224451 | 7/1999 |
| CN | 1252094 | 5/2000 |

(Continued)

OTHER PUBLICATIONS

CTFA Cosmetic Ingredient Handbook, Second Edition, 1992, 2 pages.
Database WPI, Week 201626, Jun. 1, 2016, Thomson Scientific, London, GB, AN 2015-741090, XP002769807, & CN105037644A.
English translation of Chinese Seach Report for App. No. CN201780083758.8, 2 pages.
Georg Odian, "Principles of Polymerization, Third Edition", A Wiley-Interscience Publication, New York, in chapter 1-4, p. 19 to 24, ISBN 0-471-61020-8, 1991.
International Cosmetic Ingredient Dictionary, Fifth Edition, 1993.
K. H. Wallhäusser in "Praxis der Sterilisation, Desinfektion—Konservierung: Keimidentifizierung—Betriebshygiene" (5. Auflage—Stuttgart; New York: Thieme, 1995).
Machine translation of CN-105542090-A. (Year: 2016).

(Continued)

*Primary Examiner* — Brian P Mruk
(74) *Attorney, Agent, or Firm* — Tod A. Waldrop

(57) ABSTRACT

What are described are copolymers containing cationic structural units and macromonomeric structural units. The copolymers are, for example, advantageously suitable for use in detergent compositions and lead to advantageous shine results, for example, after application on hard surfaces.

20 Claims, No Drawings

(56) References Cited

U.S. PATENT DOCUMENTS

| | | |
|---|---|---|
| 4,663,071 A | 5/1987 | Bush |
| 4,664,839 A | 5/1987 | Rieck |
| 4,702,857 A | 10/1987 | Gosselink |
| 5,104,646 A | 4/1992 | Bolich, Jr. |
| 5,194,639 A | 3/1993 | Connor |
| 5,858,948 A | 1/1999 | Ghosh |
| 6,255,267 B1 | 7/2001 | Nayar |
| 6,410,005 B1 | 6/2002 | Galleguillos |
| 6,482,793 B1 | 11/2002 | Gordon |
| 6,569,261 B1 | 5/2003 | Aubay |
| 7,160,947 B2 | 1/2007 | Claesson |
| 7,202,200 B1 | 4/2007 | Deleo |
| 8,158,699 B2 | 4/2012 | Freidrich |
| 9,017,652 B1 | 4/2015 | Askar |
| 9,796,872 B2 | 10/2017 | Scheuing |
| 2004/0115157 A1 | 6/2004 | Loffler |
| 2005/0239674 A1 | 10/2005 | Dreja |
| 2006/0276371 A1 | 12/2006 | Schreiner |
| 2007/0110699 A1 | 5/2007 | Sherry |
| 2010/0087569 A1* | 4/2010 | Friedrich ............ C04B 24/2688 524/5 |
| 2010/0139705 A1 | 6/2010 | Oberlander |
| 2010/0240563 A1 | 9/2010 | Jaynes |
| 2010/0292116 A1* | 11/2010 | Uchiyama ............. A61K 8/463 510/122 |
| 2011/0144264 A1 | 6/2011 | Hidalgo |
| 2013/0303425 A1 | 11/2013 | Scialla |
| 2014/0005095 A1 | 1/2014 | Perdigon |
| 2014/0066547 A1* | 3/2014 | Schinabeck ......... C04B 24/2658 524/80 |
| 2014/0213748 A1* | 7/2014 | Blondel ................ C08F 220/56 526/218.1 |
| 2014/0378639 A1 | 12/2014 | Blondel |
| 2016/0185888 A1 | 6/2016 | Chang |
| 2019/0276771 A1 | 9/2019 | Benson |
| 2019/0307668 A1 | 10/2019 | Stricane |
| 2019/0330565 A1 | 10/2019 | Mutch |
| 2019/0375871 A1 | 12/2019 | Benson |
| 2019/0382686 A1 | 12/2019 | Benson |
| 2020/0063070 A1 | 2/2020 | Mutch |
| 2020/0080029 A1 | 3/2020 | Benson |

FOREIGN PATENT DOCUMENTS

| | | |
|---|---|---|
| CN | 1334830 | 2/2002 |
| CN | 1606577 | 4/2005 |
| CN | 101528791 | 9/2009 |
| CN | 102604752 | 7/2012 |
| CN | 102892400 | 1/2013 |
| CN | 103189489 | 7/2013 |
| CN | 104039849 | 9/2014 |
| CN | 104203209 | 12/2014 |
| CN | 104903368 | 9/2015 |
| CN | 105037644 | 11/2015 |
| CN | 105542090 A | 5/2016 |
| CN | 105873965 | 8/2016 |
| CN | 105985482 | 10/2016 |
| CN | 109983110 | 7/2019 |
| DE | 10358587 | 7/2005 |
| DE | 102004040848 | 3/2006 |
| DE | 102005060431 | 6/2007 |
| DE | 102009001559 | 12/2009 |
| EP | 0384070 | 8/1990 |
| EP | 0467472 | 1/1992 |
| EP | 0467472 A2 | 1/1992 |
| EP | 0530974 | 3/1993 |
| EP | 0550637 | 7/1993 |
| EP | 0936224 | 8/1999 |
| EP | 1196523 | 4/2002 |
| EP | 1270624 | 1/2003 |
| EP | 1767554 | 3/2007 |
| EP | 1972683 | 9/2008 |
| EP | 2098217 | 9/2009 |
| EP | 2110117 | 10/2009 |
| EP | 2116225 | 11/2009 |
| EP | 2116226 | 11/2009 |
| FR | 2985727 | 7/2013 |
| JP | 2001181354 | 7/2001 |
| JP | 2006316035 | 11/2006 |
| JP | 2008056711 | 3/2008 |
| JP | 2010507694 | 3/2010 |
| JP | 2013227310 | 11/2013 |
| JP | 2013227311 | 11/2013 |
| JP | 2014097948 | 5/2014 |
| WO | 9206154 | 4/1992 |
| WO | 9522311 | 8/1995 |
| WO | 9631188 | 10/1996 |
| WO | 9723522 | 7/1997 |
| WO | 9742293 | 11/1997 |
| WO | 9849263 | 11/1998 |
| WO | 0105920 | 1/2001 |
| WO | 0188075 | 11/2001 |
| WO | 03031546 | 4/2003 |
| WO | 2003031546 | 4/2003 |
| WO | 2007138054 | 12/2007 |
| WO | 2008046652 | 4/2008 |
| WO | 2008049549 | 5/2008 |
| WO | 2008141844 | 11/2008 |
| WO | 2009083131 | 7/2009 |
| WO | WO 2009/083131 | * 7/2009 ............... A61K 8/81 |
| WO | 2009156067 | 12/2009 |
| WO | 2011127364 | 10/2011 |
| WO | 2012076365 | 6/2012 |
| WO | 2013060708 | 5/2013 |
| WO | 2013170001 | 11/2013 |
| WO | 2013170002 | 11/2013 |
| WO | 2013178700 | 12/2013 |
| WO | 2015078736 | 6/2015 |
| WO | 2021165188 | 8/2021 |

OTHER PUBLICATIONS

Nn: "Innovative Ingredients for Cosmetics", Jan. 1, 2015, Retrieved from the Internet: URL: http://www.goo-chem.co.jp/english/product/pdf/cosmetic/cosmetics_catalogue_en_2013.pdf, retrieved on May 3, 2017.

Renae Canterbery Pepe et al., International Cosmetic Ingredient Dictionary and Handbook, 9th Edition, 2002, vol. 4, Published by the Cosmetic, Toiletry, and Fragrance Association, 3 pages.

U.S. Pharmacopoeia, General Chapters: 461: Nitrogen Deteremination, http://www.pharmacopeia.cn/v29240/usp29nf24s0_c461.html, printed Mar. 3, 2021, 2 pages.

Co-Pending U.S. Appl. No. 17/801,160, filed Aug. 19, 2022.

International Search report for PCT/EP2017/079605, dated Apr. 12, 2018, 3 pages.

International Search report for PCT/EP2017/079939, dated Feb. 28, 2018, 2 pages.

International Search report for PCT/EP2017/079943, dated Feb. 27, 2018, 2 pages.

International Search report for PCT/EP2017/079944, dated Feb. 27, 2018, 2 pages.

International Search report for PCT/EP2017/079948, dated Feb. 14, 2018, 3 pages.

International Search report for PCT/EP2017/079951, dated Feb. 26, 2018, 2 pages.

International Search report for PCT/EP2017/079956, dated Feb. 27, 2018, 2 pages.

International Search report for PCT/EP2021/053604, dated Apr. 30, 2021, 3 pages.

Machine Translation of WO2009083131, Jul. 9, 2009, 43 pages.

* cited by examiner

COPOLYMERS AND THE USE OF SAME IN CLEANING AGENT COMPOSITIONS

The present invention relates to copolymers containing cationic structural units and macromonomeric structural units, to detergent compositions comprising copolymers of this kind, and to the use of the copolymers or the detergent compositions, especially for production of shine on hard surfaces, for hydrophilization of hard surfaces and for achievement of a repair effect on hard surfaces.

Commercial detergent formulations enable the efficient cleaning of hard surfaces in industry, in household or in general. They generally consist of an aqueous solution of surfactants, especially nonionic and anionic surfactants, alcohol(s) to facilitate drying, bases to adjust the pH and optionally quaternary amines as disinfectant.

WO 2013/170001 and WO 2013/170002 describe cleaning product formulations which comprise alkoxylated polyethyleneimine polymers and lead to improvement of shine on hard surfaces.

WO 2009/156067 describes cleaning product formulations which comprise graft copolymers of saccharides and can be used for improvement of the retention of shine of hard surfaces and/or have hydrophilizing properties.

WO 2003/031546 describes aqueous antimicrobial cleaning product compositions for treatment of hard surfaces, with the outcome of achieving retention of shine or an improvement in shine of the hard surfaces.

WO 98/49263 describes aqueous acidic surface detergents which comprise a polymer additive and achieve improved shine of the surface.

US 2014/0005095 describes cleaning product compositions for hard surfaces which achieve a shiny, streak-free surface.

EP 1196523 B1 describes detergent compositions which are intended for treatment of hard surfaces in industry, in the household or else in general, the particular aim of which is to impart hydrophilic properties and protective properties to these surfaces.

Even though good results can already be achieved with the known systems, there is a great deal of room for improvement. A significant shortcoming of these detergent formulations is often that residues of the cleaning product formulation are visible in the form of stripes, streaks or stains on the hard surface after drying, and hence the gloss of the surface is minimized.

It was an object of the present invention to develop polymer additives which are water-soluble or water-dispersible and can be added to detergent compositions, especially with the result that advantageous shine effects can be observed on the hard surfaces after employment thereof on said hard surfaces.

It has been found that, surprisingly, this object can be achieved by copolymers containing a) 0.1 to 99.4 mol %, preferably 15.0 to 84.5 mol % and more preferably 23.0 to 79.0 mol % of one or more cationic structural units (A) and b) 0.4 to 4.5 mol %, preferably 0.5 to 4.4 mol % and more preferably 1.0 to 4.4 mol % of one or more macromonomeric structural units (B), where the one or more structural units (A) is/are represented by the following formulae (I) and/or (II):

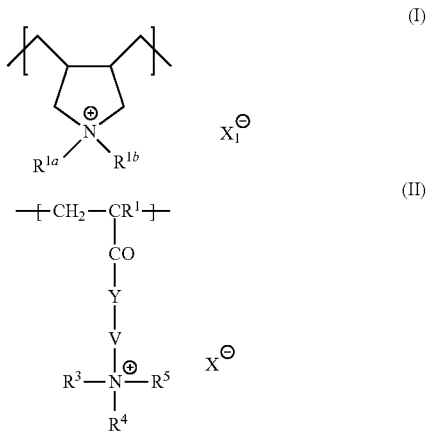

in which
$R^1$ and $R^{1a}$ are each the same or different and are each independently hydrogen and/or a methyl radical,
$R^{1b}$, $R^3$, $R^4$ and $R^5$ are each the same or different and are each independently represented by hydrogen, an aliphatic hydrocarbyl radical having 1 to 20 and preferably 1 to 4 carbon atoms, a cycloaliphatic hydrocarbyl radical having 5 to 20 and preferably 5 to 8 carbon atoms, an aryl radical having 6 to 14 carbon atoms and/or polyethylene glycol (PEG), are preferably each the same or different and are each independently represented by hydrogen and/or methyl and are more preferably each methyl,
Y is the same or different and is represented by oxygen, NH and/or $NR^3$
V is the same or different and is represented by $-(CH_2)_x-$,

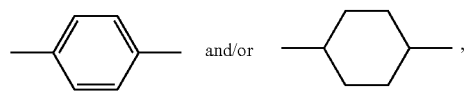

x is the same or different and is represented by an integer from 1 to 6,
X and $X_1$ are each the same or different and are each independently represented by a halogen atom, $C_1$- to $C_4$-alkylsulfate and/or $C_1$- to $C_4$-alkylsulfonate,
and the one or more macromonomeric structural units (B) is/are represented by the formula (III):

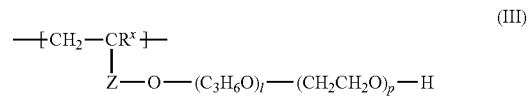

in which
$R^x$ is the same or different and is represented by H and/or methyl,
Z is the same or different and is represented by C=O and/or $O(CH_2)_4$ and is preferably $O(CH_2)_4$,
l on molar average is a number from 0 to 7 and preferably from 0 to 6, and
p on molar average is a number from 1 to 150, preferably from 11 to 150 and more preferably from 12 to 150.

The present invention therefore provides copolymers containing
a) 0.1 to 99.4 mol %, preferably 15.0 to 84.5 mol % and more preferably 23.0 to 79.0 mol % of one or more cationic structural units (A) and
b) 0.4 to 4.5 mol %, preferably 0.5 to 4.4 mol % and more preferably 1.0 to 4.4 mol % of one or more macromonomeric structural units (B), where the one or more structural units (A) is/are represented by the following formulae (I) and/or (II):

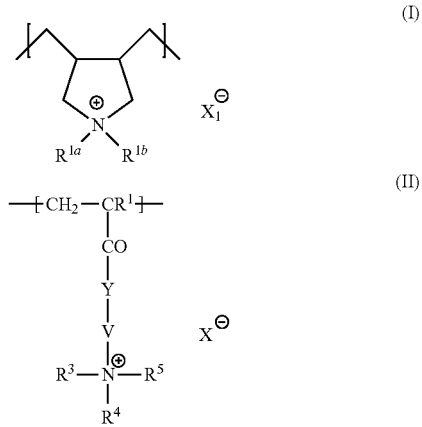

in which
$R^1$ and $R^{1a}$ are each the same or different and are each independently hydrogen and/or a methyl radical,
$R^{1b}$, $R^3$, $R^4$ and $R^5$ are each the same or different and are each independently represented by hydrogen, an aliphatic hydrocarbyl radical having 1 to 20 and preferably 1 to 4 carbon atoms, a cycloaliphatic hydrocarbyl radical having 5 to 20 and preferably 5 to 8 carbon atoms, an aryl radical having 6 to 14 carbon atoms and/or polyethylene glycol (PEG), are preferably each the same or different and are each independently represented by hydrogen and/or methyl and are more preferably each methyl,
Y is the same or different and is represented by oxygen, NH and/or $NR^3$
V is the same or different and is represented by $—(CH_2)_x—$,

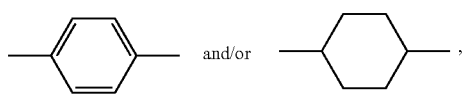

x is the same or different and is represented by an integer from 1 to 6,
X and $X_1$ are each the same or different and are each independently represented by a halogen atom, $C_1$- to $C_4$-alkylsulfate and/or $C_1$- to $C_4$-alkylsulfonate,
and the one or more macromonomeric structural units (B) is/are represented by the formula (III):

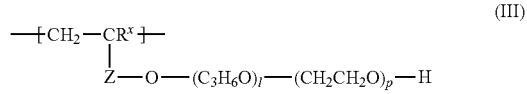

in which
$R^x$ is the same or different and is represented by H and/or methyl,
Z is the same or different and is represented by C=O and/or $O(CH_2)_4$ and is preferably $O(CH_2)_4$,
l on molar average is a number from 0 to 7 and preferably from 0 to 6, and
p on molar average is a number from 1 to 150, preferably from 11 to 150 and more preferably from 12 to 150.

The term "hard surface" in the context of the invention means a surface made from dimensionally fixed materials, for example made of plastic, ceramic, stone, for example natural stone, porcelain, glass, wood, linoleum or metal, for example stainless steel, typically surfaces in the kitchen and sanitary sector, for example in kitchens, bathrooms and toilets, in the household, but also in the industrial sector, for example in butchers' shops, slaughterhouses, dairies, storage tanks for food and drink products or industrial products, and in the public sector, for example building frontages, in swimming baths or in railway stations.

WO 2012/076365 A1 discloses cationic copolymers containing cationic structural units and macromonomeric structural units, and the use thereof as additive for building material systems, especially based on calcium sulfate.

WO 2008/049549 A2 describes hydrophobically modified cationic copolymers having at least three different structural units, one structural unit of which has a terminal phenyl group or specifically substituted phenyl group. With the aid of the copolymers, especially in combination with anionic surfactants, even in the case of high salt burdens, it is possible to achieve a considerable improvement in water retention in aqueous building material systems based on hydraulic binders such as cement.

WO 2008/141844 A1 describes dispersions comprising inorganic particles, water and at least one water-soluble polymer. The at least one water-soluble polymer has repeat units derived from monomers having at least one quaternally ammonium group, repeat units derived from monomers having at least one carboxyl group, and repeat units derived from polyalkoxyalkylene group-containing ester monomers having a number-average molecular weight in the range from 3000 g/mol to 10 000 g/mol. The dispersions can especially be used for production of concrete and can be processed over a very long period of time.

WO 2008/046652 A1 describes graft polymers obtainable by copolymerization of at least one specific macromonomer and at least one further monomer having a polymerizable ethylenically unsaturated double bond, and the use thereof as dispersants, for example in pigment concentrates.

US 2011/0144264 A1 describes the use of substances such as polyethylene glycol (meth)acrylates or poly(ethylene-co-propylene) glycol (meth)acrylates, for example, which, during the process of latex production, can contribute to stabilization through emulsion polymerization of at least one polymerizable monomer.

JP 2008-056711 A discloses copolymers which have a number-average molecular weight of 5000 to 1 000 000 and contain structural units which are formed by polymerization of particular cationic monomers, polyoxyalkylene-modified monomers and crosslinkable monomers, and which may additionally contain further structural units which are formed by polymerization of further monomers that can be copolymerized with the aforementioned monomers. The copolymers can be used, for example, as antistats for thermoplastic polymers.

One advantage of the invention is that the copolymers of the invention can be added to detergent compositions, and these can bring about an advantageous detergent effect on a hard surface.

A further advantage of the invention is that the copolymers of the invention can be added to detergent compositions, thus causing a shine effect on the hard surface on which they have been employed.

A further advantage of the invention is that the copolymers of the invention can be added to detergent compositions and impart hydrophilic properties to the hard surface on which they have been employed. The contact angle between the treated surface and a droplet of water or a droplet of an aqueous detergent composition can be reduced. The presence of traces or stains that are left behind on the hard surfaces by water or aqueous detergent compositions that have come into contact with them is connected to the phenomenon of the contraction of the water droplets or droplets of aqueous detergent compositions on contact with the hard surface, which leave traces behind on the surface on later drying. Moreover, through the reduction in the contact angle between the treated surface and a water droplet, it is possible to improve the speed of drying of a surface.

It is additionally possible in an advantageous manner to achieve repair effects on the hard surface on which the copolymers of the invention or the detergent compositions that comprise them have been employed.

The application of the copolymers of the invention or of the detergent compositions that comprise them can be effected in such a way that they remain on the hard surface after application ("leave-on" application) or are removed therefrom and are preferably rinsed off with water ("rinse-off" application).

The application of the copolymers of the invention or of the detergent compositions that comprise them can advantageously take place, for example, on hard surfaces in bathrooms or in kitchens, on floors or in toilets.

Preferably, the one or more structural units (A) of the copolymers of the invention is/are the polymerization product of at least one monomer species selected from the group consisting of [2-(acryloyloxy)ethyl]trimethylammonium chloride, [2-(acryloylamino)ethyl]trimethylammonium chloride, [2-(acryloyloxy)ethyl]trimethylammonium methosulfate, [2-(methacryloyloxy)ethyl]trimethylammonium chloride or methosulfate, [3-(acryloylamino)propyl]trimethylammonium chloride, [3-(methacryloylamino)propyl]trimethylammonium chloride and diallyldimethylammonium chloride (DADMAC), the structural units (A) of the copolymers of the invention is/are more preferably the polymerization product of at least one monomer species selected from the group consisting of [3-(acryloylamino)propyl]trimethylammonium chloride, [3-(methacryloylamino)propyl]trimethylammonium chloride and diallyldimethylammonium chloride, and the one or more structural units (A) of the copolymers of the invention is/are especially preferably the polymerization product of at least one monomer species selected from the group consisting of [3-(methacryloylamino)propyl]trimethylammonium chloride and diallyldimethylammonium chloride.

Preferably, the one or more macromonomeric structural units (B) of the formula (III) of the copolymers of the invention is/are the polymerization product of at least one monomer species selected from the group consisting of polyethylene glycol vinyloxybutyl ether, polyethylene glycol-co-polypropylene glycol vinyloxybutyl ether (in which l on molar average is a number from 1 to 7, preferably from 2 to 6 and more preferably from 3 to 6), polyethylene glycol (meth)acrylate and polyethylene glycol-co-polypropylene glycol (meth)acrylate (in which l on molar average is a number from 1 to 7, preferably from 2 to 6 and more preferably from 3 to 6).

In the context of the present invention, the expression "(meth)acrylate" encompasses both the corresponding acrylate compound and the corresponding methacrylate compound.

More preferably, in the one or more macromonomeric structural units (B) of the formula (III) of the copolymers of the invention,
i) $R^x$ is H, l=0 and p on molar average is a number from 1 to 150, preferably from 11 to 150 and more preferably from 12 to 150 when Z is $O(CH_2)_4$ or
ii) $R^x$ is the same or different and is represented by H and/or methyl, l on molar average is a number from 1 to 7, preferably from 2 to 6 and more preferably from 3 to 6, and p on molar average is a number from 1 to 150, preferably from 11 to 150 and more preferably from 12 to 150 when Z is C=O.

Preferably, the copolymers of the invention contain one or more structural units (C) other than the structural units (A) and (B), and preferably contain 0.1 to 99.4 mol %, more preferably 15.0 to 84.5 mol % and especially preferably 20.0 to 74.0 mol % of the one or more structural units (C).

In one embodiment of the invention which is preferred in this context, the copolymers of the invention contain one or more structural units (C) other than the structural units (A) and (B), where the one or more copolymers contain(s) preferably 0.1 to 99.4 mol % of the one or more cationic structural units (A), 0.4 to 4.5 mol % of the one or more macromonomeric structural units (B) and 0.1 to 99.4 mol % of the one or more structural units (C),
more preferably 15.0 to 84.5 mol % of the one or more cationic structural units (A), 0.5 to 4.4 mol % of the one or more macromonomeric structural units (B) and 15.0 to 84.5 mol % of the one or more structural units (C), and
especially preferably 23.0 to 79.0 mol % of the one or more cationic structural units (A), 1.0 to 4.4 mol % of the one or more macromonomeric structural units (B) and 20.0 to 74.0 mol % of the one or more structural units (C).

More preferably, the copolymers of the invention contain the one or more cationic structural units (A) in proportions of 23.0 to 79.0 mol %, the one or more macromonomeric structural units (B) in proportions of 0.4 to 4.4 mol %, preferably 0.5 to 4.4 mol % and more preferably 1.0 to 4.4 mol %, and the one or more structural units (C) in proportions of 20.0 to 74.0 mol %.

Preferably, the one or more structural units (C) of the copolymers of the invention is/are the polymerization product of at least one monomer species selected from the group consisting of noncationic acrylamides, noncationic methacrylamides and N-vinyl-substituted lactams having 5 to 7 ring atoms.

More preferably, the one or more structural units (C) of the copolymers of the invention is/are selected from the group consisting of the polymerization product of at least one N-vinyl-substituted lactam having 5 to 7 ring atoms and the structural units of the following formulae (IV) and/or (V):

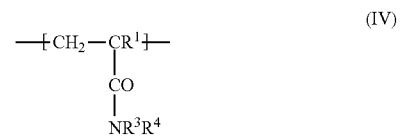

in which

R¹ is the same or different and is hydrogen and/or methyl, and

R³ and R⁴ are each the same or different and are each independently represented by hydrogen, an aliphatic hydrocarbyl radical having 1 to 20 and preferably 1 to 4 carbon atoms, a cycloaliphatic hydrocarbyl radical having 5 to 20 and preferably 5 to 8 carbon atoms, an aryl radical having 6 to 14 carbon atoms, an alkylaryl radical having 7 to 14 carbon atoms, a branched or unbranched $C_1$-$C_5$-monohydroxyalkyl group and/or polyethylene glycol (PEG),

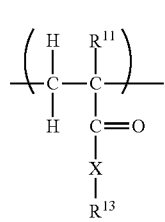 (V)

in which $R^{11}$ is the same or different and is represented by H and/or methyl;

X is the same or different and is represented by NH—$(C_nH_{2n})$ with n=1, 2, 3 or 4; and $R^{13}$ is the same or different and is represented by OH, $SO_3H$, $PO_3H_2$, O—$PO_3H_2$ and/or para-substituted $C_6H_4$—$SO_3H$.

A preferred polymerization product selected from N-vinyl-substituted lactams having 5 to 7 ring atoms is the polymerization product of N-vinylpyrrolidone.

The $SO_3H$, $PO_3H_2$, O—$PO_3H_2$ and para-substituted $C_6H_4$—$SO_3H$ groups in the structural units of the formula (V) may also be in salt form, preferably in the form of the $NH_4^+$, alkali metal or alkaline earth metal salt and more preferably of the $NH_4^+$ salt or of the $Na^+$ salt.

Among the structural units of the formula (V) in which $R^{13}$ is $N(CH_3)_2$, preference is given to those structural units that are the polymerization product of at least one monomer species selected from the group consisting of [3-(methacryloylamino)propyl]dimethylamine ($R^{11}$=methyl; X=NH—$(C_nH_{2n})$ with n=3 and $R^{13}$=$N(CH_3)_2$) and [3-(acryloylamino)propyl]dimethylamine ($R^{11}$=H; X=NH—$(C_nH_{2n})$ with n=3 and $R^{13}$=$N(CH_3)_2$).

Among the structural units of the formula (V), preference is given to those that are the polymerization product of at least one monomer species selected from the group consisting of [3-(acryloylamino)propyl]dimethylamine, [3-(methacryloylamino)propyl]dimethylamine, 2-acryloylamino-2-methylpropanesulfonic acid and the salts of 2-acryloylamino-2-methylpropanesulfonic acid, and more preferably those that are the polymerization product of at least one monomer species selected from the group consisting of 2-acryloylamino-2-methylpropanesulfonic acid and the salts of 2-acryloylamino-2-methylpropanesulfonic acid.

Especially preferably, the one or more structural units (C) of the copolymers of the invention is/are selected from the structural units of the formula (IV).

Exceptionally preferably, the one or more structural units (C) of the copolymers of the invention is/are the polymerization product of at least one monomer species selected from the group consisting of acrylamide, methacrylamide, N-methylacrylamide, N,N-dimethylacrylamide, N-ethylacrylamide, N-cyclohexylacrylamide, N-benzylacrylamide, N-methylolacrylamide, N-isopropylacrylamide and N-tert-butylacrylamide, and the one or more structural units (C) of the copolymers of the invention is/are most preferably the polymerization product of at least one monomer species selected from the group consisting of N,N-dimethylacrylamide and N-isopropylacrylamide.

In a preferred embodiment of the invention, the copolymers of the invention contain structural units (A), (B) and (C) as repeat structural units, but no further repeat structural units beyond that.

In one embodiment of the invention which is preferred in this context, the repeat structural units of the copolymers of the invention consist of:

4.0 to 90.0 mol %, preferably 15.0 to 83.5 mol % and more preferably 23.0 to 78.0 mol % of one or more cationic structural units (A) that is/are the polymerization product of at least one monomer species selected from the group consisting of [3-(acryloylamino)propyl]trimethylammonium chloride, [3-(methacryloylamino)propyl]trimethylammonium chloride and diallyldimethylammonium chloride, and preferably the polymerization product of at least one monomer species selected from the group consisting of [3-(methacryloylamino)propyl]trimethylammonium chloride and diallyldimethylammonium chloride, 1.0 to 4.5 mol %, preferably 1.5 to 4.5 mol % and more preferably 2.0 to 4.4 mol % of one or more macromonomeric structural units (B) of the formula (III) in which $R^x$ is the same or different and is represented by H and/or methyl, Z is C=O, l on molar average is a number from 1 to 7, preferably from 2 to 6 and more preferably from 3 to 6, and p on molar average is a number from 1 to 150, preferably from 11 to 150 and more preferably from 12 to 150, or $R^x$ is H, Z is $O(CH_2)_4$, l=0 and p on molar average is a number from 1 to 150, preferably from 11 to 150 and more preferably from 22 to 150, and preferably one or more macromonomeric structural units (B) of the formula (III) in which $R^x$ is H, Z is $O(CH_2)_4$, l=0 and p on molar average is a number from 1 to 150, preferably from 11 to 150 and more preferably from 22 to 150, and 9.0 to 95.0 mol %, preferably 15.0 to 80.5 mol % and more preferably 20.0 to 73.0 mol % of one or more structural units (C) that is/are the polymerization product of at least one monomer species selected from the group consisting of N-vinylpyrrolidone, N,N-dimethylacrylamide and N-isopropylacrylamide, and preferably the polymerization product of at least one monomer species selected from the group consisting of N,N-dimethylacrylamide and N-isopropylacrylamide.

In a further preferred embodiment of the invention, the copolymers of the invention contain, in addition to the structural units (A), (B) and (C), one or more structural units (D) other than the structural units (A), (B) and (C), and preferably contain 0.1 to 99.4 mol %, more preferably 0.1 to 40.0 mol % and especially preferably 0.1 to 30.0 mol % of the one or more structural units (D).

In a particularly preferred embodiment of the invention, the copolymers of the invention contain, in addition to the structural units (A), (B) and (C), one or more structural units (D) other than the structural units (A), (B) and (C), where the one or more copolymers contain(s) preferably 0.1 to 99.4 mol % of the one or more structural units (A), 0.4 to 4.5 mol % of the one or more structural units (B), 0.1 to 99.4 mol % of the one or more structural units (C) and 0.1 to 99.4 mol % of the one or more structural units (D), more preferably 15.0 to 84.4 mol % of the one or more structural units (A), 0.5 to 4.4 mol % of the one or more structural units (B), 15.0 to 80.0 mol % of the one or more structural units (C) and 0.1 to 40.0 mol % of the one or more structural units (D), and especially preferably 23.0 to 78.9 mol % of the one or more structural units (A), 1.0 to 4.4 mol % of the one or more structural units (B), 20.0 to 74.0 mol % of the one or more structural units (C) and 0.1 to 30.0 mol % of the one or more structural units (D).

If the copolymers of the invention contain one or more structural units (D), in a particularly preferred embodiment of the invention, they contain one or more structural units (D) selected from the structural units of the following formula (VIII):

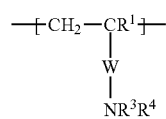
(VIII)

in which

W is the same or different and is represented by —CO—O—$(CH_2)_x$, x is an integer from 1 to 6, preferably 2 or 3, $R^1$ is the same or different and is hydrogen and/or methyl, and $R^3$ and $R^4$ are each the same or different and are each independently represented by hydrogen, an aliphatic hydrocarbyl radical having 1 to 20 and preferably 1 to 4 carbon atoms, a cycloaliphatic hydrocarbyl radical having 5 to 20 and preferably 5 to 8 carbon atoms, an aryl radical having 6 to 14 carbon atoms and/or polyethylene glycol (PEG), If the copolymers of the invention contain one or more structural units (D), these are selected, in an especially preferred embodiment of the invention, from the structural units of the formula (VIII).

Among the structural units of the formula (VIII), preference is given to those that are the polymerization product of at least one monomer species selected from the group consisting of [2-(methacryloyloxy)ethyl]dimethylamine, [2-(acryloyloxy)ethyl]dimethylamine, [2-(methacryloyloxy)ethyl]diethylamine and [2-(acryloyloxy)ethyl]diethylamine.

If the copolymers of the invention contain one or more structural units (D), in a further particularly preferred embodiment of the invention, they contain one or more structural units (D) selected from the structural units of the following formulae (IX) and/or (X):

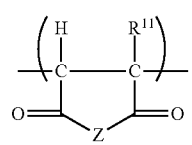
(IX)

in which $R^{11}$ is the same or different and is represented by H and/or methyl;

Z is the same or different and is represented by O and/or NH;

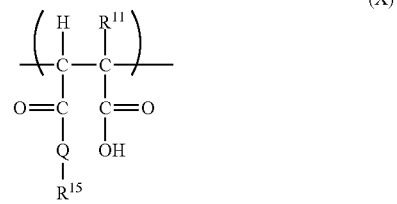
(X)

in which $R^{11}$ is the same or different and is represented by H and/or methyl;

Q is the same or different and is represented by O and/or NH; and $R^{15}$ is the same or different and is represented by H, $(C_nH_{2n})$—$SO_3H$ with n=0, 1, 2, 3 or 4; $(C_nH_{2n})$—OH with n=0, 1, 2, 3 or 4; $(C_nH_{2n})$—$PO_3H_2$ with n=0, 1, 2, 3 or 4; $(C_nH_{2n})$—$OPO_3H_2$ with n=0, 1, 2, 3 or 4; $(C_6H_4)$—$SO_3H$; $(C_6H_4)$—$PO_3H_2$; $(C_6H_4)$—$OPO_3H_2$ and/or $(C_mH_{2m})_e$—O-(A'O)$_u$—$R^{16}$ with m=0, 1, 2, 3 or 4, e=0, 1, 2, 3 or 4, A'=$C_{x'}H_{2x'}$ with x'=2, 3, 4 or 5, u=an integer from 1 to 350 and $R^{16}$ is the same or different and is represented by an unbranched or branched $C_1$-$C_4$-alkyl group.

If the copolymers of the invention contain one or more structural units (D), these are selected, in a further especially preferred embodiment of the invention, from the structural units of the formulae (IX) and/or (X).

The structural units of the formula (X) may also be in salt form, preferably in the form of the $NH_4^+$, alkali metal or alkaline earth metal salt and more preferably in the form of the $NH_4^+$ salt or in the form of the $Na^+$ salt.

Among the structural units of the formulae (IX) and (X), preference is given to those that are the polymerization product of at least one monomer species selected from the group consisting of maleic anhydride, maleic acid and the salts of maleic acid.

If the copolymers of the invention contain one or more structural units (D), in a further particularly preferred embodiment of the invention, they contain one or more structural units (D) selected from the structural units of the following formula (VII):

(VII)

in which

S is the same or different and is represented by —COOM$_k$, $R^1$ is the same or different and is represented by H and/or an unbranched or branched $C_1$-$C_4$-alkyl group and is preferably represented by H or methyl; and M is a cation selected from the group consisting of hydrogen ion, alkali metal ion and alkaline earth metal ion, with k=valency.

If the copolymers of the invention contain one or more structural units (D), these are selected, in a further especially preferred embodiment of the invention, from the structural units of the formula (VII).

Among the structural units of the formula (VII), preference is given to those that are the polymerization product of at least one monomer species selected from the group consisting of acrylic acid, sodium acrylate, potassium acrylate, methacrylic acid, sodium methacrylate and potassium methacrylate.

If the copolymers of the invention contain one or more structural units (D), in a further particularly preferred embodiment of the invention, they contain one or more structural units (D) selected from the structural units of the following formulae (Va), (Vb) and/or (Vc):

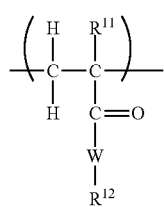

(Va)

in which
$R^{11}$ is the same or different and is represented by H and/or methyl;
W is the same or different and is represented by O;
$R^{12}$ is the same or different and is represented by a branched or unbranched $C_1$-$C_5$-monohydroxyalkyl group;

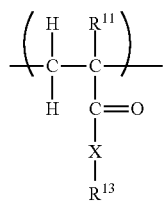

(Vb)

in which
$R^{11}$ is the same or different and is represented by H and/or methyl;
X is the same or different and is represented by O—$(C_nH_{2n})$ with n=1, 2, 3 or 4;
$R^{13}$ is the same or different and is represented by OH, $SO_3H$, $PO_3H_2$, O—$PO_3H_2$ and/or para-substituted $C_6H_4$—$SO_3H$;

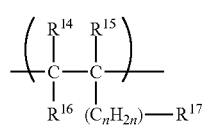

(Vc)

in which
$R^{14}$, $R^{15}$ and $R^{16}$ are each the same or different and are each independently represented by H and/or an unbranched or branched $C_1$-$C_4$-alkyl group;
n is the same or different and is represented by 0, 1, 2, 3 and/or 4;
$R^{17}$ is the same or different and is represented by $(C_6H_5)$, OH, $OR^y$ where $R^y$ is an alkyl group having 1 to 8 and preferably 4 carbon atoms, and/or —$OOCCH_3$.

If the copolymers of the invention contain one or more structural units (D), these are selected, in a further especially preferred embodiment of the invention, from the structural units of the formulae (Va), (Vb) and/or (Vc).

The $SO_3H$, $PO_3H_2$, O—$PO_3H_2$ and para-substituted $C_6H_4$—$SO_3H$ groups in the structural units of the formula (Vb) may also be in salt form, preferably in the form of the $NH_4^+$, alkali metal or alkaline earth metal salt and more preferably of the $NH_4^+$ salt or of the $Na^+$ salt.

Among the structural units of the formula (Vc), preference is given to those that are the polymerization product of at least one monomer species selected from the group consisting of vinyl butyl ether and vinyl acetate.

In a further preferred embodiment of the invention, the copolymers of the invention contain structural units (A), (B), (C) and (D) as repeat structural units, but no further repeat structural units beyond that.

In one embodiment of the invention which is preferred in this context, the repeat structural units of the copolymers of the invention consist of:
0.1 to 99.4 mol %, preferably 15.0 to 84.4 mol % and more preferably 23.0 to 78.9 mol % of one or more cationic structural units (A) that is/are preferably the polymerization product of at least one monomer species selected from the group consisting of [3-(acryloylamino)propyl]trimethylammonium chloride, [3-(methacryloylamino)propyl]trimethylammonium chloride and diallyldimethylammonium chloride, and more preferably the polymerization product of [3-(methacryloylamino)propyl]trimethylammonium chloride,
0.4 to 4.5 mol %, preferably 0.5 to 4.4 mol % and more preferably 1.0 to 4.4 mol % of preferably one or more macromonomeric structural units (B) of the formula (III) in which $R^x$ is the same or different and is represented by H and/or methyl, Z is C=O, l on molar average is a number from 1 to 5, preferably from 1 to 4 and more preferably from 2 to 4, and p on molar average is a number from 1 to 150, preferably from 11 to 150 and more preferably from 22 to 150, or $R^x$ is H, Z is $O(CH_2)_4$, l=0 and p on molar average is a number from 1 to 150, preferably from 11 to 150 and more preferably from 22 to 150, and more preferably one or more macromonomeric structural units (B) of the formula (III) in which $R^x$ is H, Z is $O(CH_2)_4$, l=0 and p on molar average is a number from 1 to 150, preferably from 11 to 150 and more preferably from 22 to 150,
0.1 to 99.4 mol %, preferably 15.0 to 80.0 mol % and more preferably 20.0 to 74.0 mol % of one or more structural units (C) that is/are preferably the polymerization product of at least one monomer species selected from the group consisting of N,N-dimethylacrylamide and N-isopropylacrylamide, and more preferably the polymerization product of N,N-dimethylacrylamide and
0.1 to 99.4 mol %, preferably 0.1 to 40.0 mol % and more preferably 0.1 to 30.0 mol % of one or more structural units (D) that is/are preferably the polymerization product of at least one monomer species selected from the group consisting of maleic anhydride, maleic acid and the salts of maleic acid.

Preferably, the structural units (A), (B) and, if present, (C) and (D) in the copolymers of the invention are present in the copolymer in a random, blockwise, alternating or gradient distribution.

Preferably, the weight-average molecular weights $M_w$ of the copolymers of the invention are from 10 000 to 250 000 g/mol, more preferably from 15 000 to 200 000 g/mol and especially preferably from 20 000 to 150 000 g/mol.

The copolymers of the invention contain repeat structural units (generally —$C(R^{s1})(R^{s2})$—$C(R^{s3})(R^{s4})$—) that are the polymerization product of appropriate monomers with polymerizable olefinic double bonds (generally $C(R^{s1})(R^{s2})$ =$C(R^{s3})(R^{s4})$). The $R^{s1}$, $R^{s2}$, $R^{s3}$ and $R^{s4}$ radicals are not defined here in detail, but merely for the sake of completeness are specified as radicals are bonded to the corresponding carbon atoms "C". The structural units (A) and (B) that are present in the copolymers of the invention and the structural units (C) and (D) that are optionally additionally present in the copolymers of the invention are, for example, repeat structural units of this kind. Structural units that originate, for example, from free-radical initiators or from any chain-transfer agents used in the copolymerization are not repeat structural units. Accordingly, repeat structural units are not understood to mean terminal groups, for example. The amounts in mol % that are stated for the structural units (A), (B), (C) and (D) are based on the total amount of the repeat structural units present in the respective copolymers of the invention.

The copolymers of the invention can be prepared by methods familiar to those skilled in the art. More preferably, the copolymers of the invention can be prepared by free-radical solution polymerization. Standard solvents may preferably be polar solvents such as alcohols or water, and alcohol-water mixtures. The polymerization is initiated by free-radical sources, for example inorganic persulfates, organic azo compounds, peroxides, inorganic redox systems, or UV light. In addition, it is possible to use chain-transfer agents that form less reactive free radicals, in order to control the molecular weight of the copolymers. Chain transfer agents of this kind are, for example, phenols, thiols, for example sodium 2-mercaptoethanesulfonate, or sodium hypophosphite. In an illustrative procedure, the monomers for preparation of the copolymers of the invention and, if appropriate, a chain-transfer agent are dissolved in the solvent, oxygen is driven out, then the temperature is increased, and the free-radical initiator is metered in. The copolymerization is then conducted at the desired temperature for the desired period of time. The reaction mixture is then optionally cooled and the copolymer formed is either processed further in solution or worked up; for example, the solution containing the copolymer can be concentrated by partly evaporating off the solvent, optionally under reduced pressure, or the solvent can be removed completely by evaporating it off or else the copolymer can be isolated in some other way, for example by freeze-drying or precipitation.

As already mentioned, the copolymers of the invention can advantageously be used in detergent compositions. In the detergent compositions, the copolymers of the invention are component Z1). These detergent compositions are described in detail hereinafter.

Preferably, the detergent compositions comprise one or more copolymers of component Z1) in an amount of 0.005% to 10% by weight, more preferably in an amount of 0.01% to 5% by weight and especially preferably in an amount of 0.1% to 0.5% by weight, based in each case on the total weight of the detergent composition.

Component Z2)

The detergent compositions comprise one or more surfactants as component Z2).

Preferably, the one or more surfactants of component Z2) of the detergent compositions is/are selected from the group consisting of anionic, nonionic, amphoteric and cationic surfactants.

The detergent compositions may optionally comprise anionic surfactants, for example alkylbenzenesulfonates, alkyl sulfates, alkyl ether sulfates, alkanesulfonates, alkyl ether carboxylic acids, sulfosuccinates, isethionates, taurates, glycinates and/or acylglutamates. The alkyl chains of the surfactants mentioned may be of synthetic or natural origin and consist of 8 to 30, preferably 8 to 18 and more preferably 12 to 14 carbon atoms in a linear or branched arrangement.

Anionic surfactants used in accordance with the invention are preferably aliphatic sulfates such as fatty alcohol sulfates, fatty alcohol ether sulfates, dialkyl ether sulfates, monoglyceride sulfates, and aliphatic sulfonates such as alkanesulfonates, olefinsulfonates, ether sulfonates, n-alkyl ether sulfonates, ester sulfonates and lignosulfonates. Likewise usable in the context of the present invention are alkylbenzenesulfonates, fatty acid cyanamides, sulfosuccinates (sulfosuccinic esters), sulfosuccinamates, sulfosuccinamides, fatty acid isethionates, acylaminoalkanesulfonates (fatty acid taurides), fatty acid sarcosinates, ether carboxylic acids and alkyl (ether) phosphates, and also [alpha]-sulfo fatty acid salts, acylglutamates, monoglyceride disulfates and alkyl ethers of glycerol disulfate.

Among these, preference is given to the fatty alcohol sulfates and/or fatty alcohol ether sulfates, especially the fatty alcohol sulfates. Fatty alcohol sulfates are products of sulfation reactions on corresponding alcohols, while fatty alcohol ether sulfates are products of sulfation reactions on alkoxylated alcohols. The person skilled in the art generally understands alkoxylated alcohols to mean the reaction products of alkylene oxide, preferably ethylene oxide, with alcohols, in the context of the present invention preferably with longer-chain alcohols. In general, n moles of ethylene oxide and one mole of alcohol, depending on the reaction conditions, give rise to a complex mixture of addition products of different degrees of ethoxylation. A further embodiment of the alkoxylation involves the use of mixtures of alkylene oxides, preferably of the mixture of ethylene oxide and propylene oxide. Preferred fatty alcohol ether sulfates are the sulfates of fatty alcohols having low levels of ethoxylation with 1 to 4 ethylene oxide units (EO), especially 1 to 2 EO, for example 1.3 EO.

Particular preference is given to alkylbenzenesulfonate, alkanesulfonate, alkyl ether sulfate or alkyl sulfate.

The anionic surfactants are typically used in the form of salts, but also in acid form. The salts are preferably alkali metal salts, alkaline earth metal salts, ammonium salts and mono-, di- or trialkanolammonium salts, for example mono-, di- or triethanolammonium salts, especially lithium, sodium, potassium or ammonium salts, more preferably sodium or potassium salts, especially preferably sodium salts.

Further surfactants may be nonionic, amphoteric and/or cationic surfactants, for example betaines, amidobetaines, amine oxides, amidoamine oxides, fatty alcohol polyglycol ethers, alkyl polyglycosides or else quaternary ammonium compounds.

Further nonionic surfactants may, for example, be alkoxylates, such as polyglycol ethers, fatty alcohol polyglycol ethers (fatty alcohol alkoxylates), alkyl phenol polyglycol ethers, end group-capped polyglycol ethers, mixed ethers and hydroxy mixed ethers, and fatty acid polyglycol esters. Likewise usable are ethylene oxide-propylene oxide block copolymers and fatty acid alkanolamides and fatty acid polyglycol ethers. A further important class of nonionic surfactants that can be used in accordance with the invention is that of the polyol surfactants and here particularly the glycosurfactants, such as alkyl polyglycosides, especially alkyl polyglucosides.

Suitable fatty alcohol polyglycol ethers are ethylene oxide (EO)- and/or propylene oxide (PO)-alkoxylated, unbranched or branched, saturated or unsaturated $C_8$-$C_{22}$ alcohols having an alkoxylation level of up to 30, preferably ethoxylated $C_{10}$-$C_{18}$ fatty alcohols having an ethoxylation level of less than 30, more preferably 1 to 20, especially preferably 1 to 12 and exceptionally preferably 1 to 8, for example $C_{12}$-$C_{14}$ fatty alcohol ethoxylates with 8 EO.

Alkyl polyglycosides are surfactants that can be obtained by the reaction of sugars and alcohols by the relevant methods of preparative organic chemistry, which results in a mixture of monoalkylated, oligomeric or polymeric sugars according to the manner of preparation. Preferred alkyl polyglycosides are the alkyl polyglucosides, where the alcohol is more preferably a long-chain fatty alcohol or a mixture of long-chain fatty alcohols having branched or branched $C_8$- to $C_{18}$-alkyl chains and the oligomerization level (DP) of the sugars is from 1 to 10, preferably from 1 to 6, more preferably from 1.1 to 3 and especially preferably from 1.1 to 1.7, for example $C_8$-$C_{10}$-alkyl-1,5-glucoside (DP of 1.5).

The amphosurfactants (zwitterionic surfactants) that are usable in accordance with the invention include betaines, amine oxides, alkylamidoalkylamines, alkyl-substituted amino acids, acylated amino acids and biosurfactants.

Suitable betaines are the alkyl betaines, the alkylamidobetaines, the imidazolinium betaines, the sulfobetaines (INCI Sultaines) and the amidosulfobetaines, and also the phosphobetaines. Examples of suitable betaines and sulfobetaines are the following compounds named according to INCI: Almondamidopropyl Betaine, Apricotamidopropylbetaine, Avocadamidopropylbetaine, Babassuamidopropylbetaine, Behenamidopropylbetaine, Behenylbetaine, Betaine, Canolamidopropylbetaine, Capryl/Capramidopropylbetaine, Carnitine, Cetylbetaine, Cocam idoethylbetaine, Cocam idopropylbetaine, Cocam idopropylhydroxysultaine, Cocobetaine, Cocohydroxysultaine, Coco/Oleamidopropylbetaine, Coco-Sultaine, Decylbetaine, Dihydroxyethyloleylglycinate, Dihydroxyethyl Soy Glycinate, Dihydroxyethylstearylglycinate, Dihydroxyethyl Tallow Glycinate, Dimethicone Propyl PG-Betaine, Erucamidopropylhydroxysultaine, Hydrogenated Tallow Betaine, Isostearamidopropylbetaine, Lauramidopropylbetaine, Laurylbetaine, Laurylhydroxysultaine, Laurylsultaine, Milkamidopropylbetaine, Minkamidopropylbetaine, Myristamidopropylbetaine, Myristylbetaine, Oleamidopropylbetaine, Oleamidopropylhydroxysultaine, Oleylbetaine, Olivam idopropylbetaine, Palmam idopropylbetaine, Palm itam idopropylbetaine, Palmitoyl Carnitine, Palm Kernelamidopropyl Betaine, Polytetrafluoroethylene Acetoxypropyl Betaine, Ricinoleamidopropylbetaine, Sesamidopropylbetaine, Soyam idopropylbetaine, Stearam idopropylbetaine, Stearylbetaine, Tallowamidopropylbetaine, Tallowamidopropylhydroxysultaine, Tallowbetaine, Tallowdihydroxyethylbetaine, Undecylenamidopropylbetaine and Wheat Germamidopropyl Betaine.

The amine oxides suitable in accordance with the invention include alkylamine oxides, especially alkyldimethylamine oxides, alkylamidoamine oxides and alkoxyalkylamine oxides.

Examples of suitable amine oxides are the following compounds named according to INCI: Almondamidopropylamine Oxide, Babassuamidopropylamine Oxide, Behenamine Oxide, Cocamidopropyl Amine Oxide, Cocamidopropylamine Oxide, Cocamine Oxide, Coco-Morpholine Oxide, Decylamine Oxide, Decyltetradecylamine Oxide, Diaminopyrimidine Oxide, Dihydroxyethyl $C_8$-$C_{10}$ Alkoxypropylamine Oxide, Dihydroxyethyl $C_9$-$C_{11}$ Alkoxypropylamine Oxide, Dihydroxyethyl $C_{12}$-$C_{15}$ Alkoxypropylamine Oxide, Dihydroxyethyl Cocamine Oxide, Dihydroxyethyl Lauramine Oxide, Dihydroxyethyl Stearamine Oxide, Dihydroxyethyl Tallowamine Oxide, Hydrogenated Palm Kernel Amine Oxide, Hydrogenated Tallowamine Oxide, Hydroxyethyl Hydroxypropyl $C_{12}$-$C_{15}$ Alkoxypropylamine Oxide, Isostearamidopropylamine Oxide, Isostearamidopropyl Morpholine Oxide, Lauramidopropylamine Oxide, Lauramine Oxide, Methyl Morpholine Oxide, Milkamidopropyl Amine Oxide, Minkamidopropylamine Oxide, Myristamidopropylamine Oxide, Myristamine Oxide, Myristyl/Cetyl Amine Oxide, Oleamidopropylamine Oxide, Oleamine Oxide, Olivamidopropylamine Oxide, Palmitamidopropylamine Oxide, Palmitamine Oxide, PEG-3 Lauramine Oxide, Potassium Dihydroxyethyl Cocamine Oxide Phosphate, Potassium Trisphosphonomethylamine Oxide, Sesamidopropylamine Oxide, Soyamidopropylamine Oxide, Stearamidopropylamine Oxide, Stearamine Oxide, Tallowamidopropylamine Oxide, Tallowamine Oxide, Undecylenamidopropylamine Oxide and Wheat Germamidopropylamine Oxide.

Illustrative alkylamidoalkylamines are the following compounds named according to INCI: Cocoamphodipropionic Acid, Cocobetainamido Amphopropionate, DEA-Cocoamphodipropionate, Disodium Caproamphodiacetate, Disodium Caproamphodipropionate, Disodium Capryloamphodiacetate, Disodium Capryloamphodipropionate, Disodium Cocoam phocarboxyethylhydroxypropylsulfonate, Disodium Cocoamphodiacetate, Disodium Cocoamphodipropionate, Disodium Isostearoamphodiacetate, Disodium Isostearoamphodipropionate, Disodium Laureth-5 Carboxyamphodiacetate, Disodium Lauroamphodiacetate, Disodium Lauroamphodipropionate, Disodium Oleoamphodipropionate, Disodium PPG-2-Isodeceth-7 Carboxyamphodiacetate, Disodium Stearoamphodiacetate, Disodium Tallowamphodiacetate, Disodium Wheatgermamphodiacetate, Lauroamphodipropionic Acid, Quaternium-85, Sodium Caproamphoacetate, Sodium Caproamphohydroxypropylsulfonate, Sodium Caproamphopropionate, Sodium Capryloamphoacetate, Sodium Capryloamphohydroxypropylsulfonate, Sodium Capryloamphopropionate, Sodium Cocoamphoacetate, Sodium Cocoamphohydroxypropylsulfonate, Sodium Cocoamphopropionate, Sodium Cornamphopropionate, Sodium Isostearoamphoacetate, Sodium Isostearoamphopropionate, Sodium Lauroamphoacetate, Sodium Lauroamphohydroxypropylsulfonate, Sodium Lauroampho PG-Acetate Phosphate, Sodium Lauroamphopropionate, Sodium Myristoamphoacetate, Sodium Oleoamphoacetate, Sodium Oleoamphohydroxypropylsulfonate, Sodium Oleoamphopropionate, Sodium Ricinoleoamphoacetate, Sodium Stearoamphoacetate, Sodium Stearoamphohydroxypropylsulfonate, Sodium Stearoamphopropionate, Sodium Tallamphopropionate, Sodium Tallowamphoacetate, Sodium Undecylenoamphoacetate, Sodium Undecylenoamphopropionate, Sodium Wheat Germamphoacetate and Trisodium Lauroampho PG-Acetate Chloride Phosphate.

Illustrative alkyl-substituted amino acids are the following compounds named according to INCI: Aminopropyl Laurylglutamine, Cocaminobutyric Acid, Cocaminopropionic Acid, DEA-Lauraminopropionate, Disodium Cocaminopropyl Iminodiacetate, Disodium Dicarboxyethyl Cocopropylenediamine, Disodium Lauriminodipropionate, Disodium Steariminodipropionate, Disodium Tallowiminodipropionate, Lauraminopropionic Acid, Lauryl Aminopropylglycine, Lauryl Diethylenediaminoglycine, Myristaminopropionic Acid, Sodium $C_{12}$-$C_{15}$ Alkoxypropyl Iminodipropionate, Sodium Cocaminopropionate, Sodium Lauraminopropionate, Sodium Lauriminodipropionate, Sodium Lauroyl Methylaminopropionate, TEA-Lauraminopropionate and TEA-Myristaminopropionate.

More preferably, the one or more surfactants of component Z2) of the detergent compositions is/are selected from the group consisting of fatty alcohol polyglycol ethers, alkyl polyglycosides, alkylbenzenesulfonates, alkanesulfonates, alkyl ether sulfates, alkyl sulfates and quaternary ammonium compounds.

The proportion of the one or more surfactants of component Z2) in the detergent composition is preferably from 0.1% to 20% by weight and more preferably from 0.1% to 6.0% by weight, based in each case on the total weight of the detergent composition.

Component Z3)

The detergent compositions comprise water as component Z3).

The proportion of water in the detergent compositions is preferably from 10.00% to 99.89% by weight, more preferably from 40.00% to 98.00% and especially preferably from 70% to 97.00% by weight, based in each case on the total weight of the detergent compositions.

Preferably, the detergent compositions comprise, in addition to the one or more copolymers of component Z1), the one or more surfactants of component Z2) and water of component Z3), one or more further substances selected from components Z4), Z5), Z6) and/or Z7):

Z4) one or more inorganic or organic acids as component Z4),

Z5) one or more complexing agents as component Z5),

Z6) one or more solvents other than water as component Z6),

Z7) one or more further additives, preferably selected from the group consisting of viscosity regulators, enzymes, bleaches, preservatives, fragrances and dyes, as component Z7), and the pH of the detergent composition is preferably from 1 to 14 and more preferably from 3 to 11.

Component Z4)

The acids may be inorganic acids, for example hydrochloric acid, sulfuric acid, nitric acid, amidosulfonic acid and/or phosphoric acid.

In a preferred embodiment of the invention, the acids present are organic acids, more preferably non-complexing acids such as lactic acid, formic acid, acetic acid, glycolic acid and/or gluconic acid. Further preferred acids are malic acid, citric acid, tartaric acid, adipic acid and/or succinic acid. In a preferred embodiment, the detergent compositions comprise an acid. In a further preferred embodiment of the invention, the detergent compositions comprise a mixture of two or more acids.

The amount of acid used, if it is not 0%, is preferably from 0.1% to 10% by weight, more preferably from 0.2% to 5% by weight and especially preferably from 1% to 3% by weight, based in each case on the total weight of the detergent composition.

In a further preferred embodiment of the invention, for buffering of the pH, it is also possible to add a salt of an acid, especially the sodium, potassium or magnesium salt, but also further alkali metal or alkaline earth metal salts or else ammonium salts, especially of volatile amines such as monoethanolamine, ammonia, diethanolamine or else triethanolamine. In a particularly preferred embodiment of the invention, the salt(s) of the acid(s) already present is/are used.

Component Z5)

Suitable complexing agents are known to those skilled in the art and are described by way of example in DE-A-10 2009 001 559.

Complexing agents (INCI Chelating Agents), also called sequestrants, are ingredients able to complex and inactivate the metal ions, in order to prevent their adverse effects on the stability or appearance of the compositions, for example cloudiness. On the one hand, it is firstly important to complex the calcium and magnesium ions of water hardness that are incompatible with numerous ingredients. The complexation of the ions of heavy metals such as iron or copper secondly delays the oxidative breakdown of the finished compositions. Moreover, the complexing agents promote detergent action.

Suitable examples are the following complexing agents named according to INCI: Aminotrimethylene, Phosphonsaure, Beta-Alanine Diacetic Acid, Calcium Disodium EDTA, Citric Acid, Cyclodextrin, Cyclohexanediamine Tetraacetic Acid, Diammonium Citrate, Diammonium EDTA, Diethylenetriamine Pentamethylene Phosphonic Acid, Dipotassium EDTA, Disodium Azacycloheptane Diphosphonate, Disodium EDTA, Disodium Pyrophosphate, EDTA, Etidronic Acid, Galactaric Acid, Gluconic Acid, Glucuronic Acid, HEDTA, Hydroxypropyl Cyclodextrin, Methyl Cyclodextrin, Pentapotassium Triphosphate, Pentasodium Aminotrimethylene Phosphonate, Pentasodium Ethylenediamine Tetramethylene Phosphonate, Pentasodium Pentetate, Pentasodium Triphosphate, Pentetic Acid, Phytic Acid, Potassium Citrate, Potassium EDTMP, Potassium Gluconate, Potassium Polyphosphate, Potassium Trisphosphonomethylamine Oxide, Ribonic Acid, Sodium Chitosan Methylene Phosphonate, Sodium Citrate, Sodium Diethylenetriamine Pentamethylene Phosphonate, Sodium Dihydroxyethylglycinate, Sodium EDTMP, Sodium Gluceptate, Sodium Gluconate, Sodium Glycereth-1 Polyphosphate, Sodium Hexametaphosphate, Sodium Metaphosphate, Sodium Metasilicate, Sodium Phytate, Sodium Polydimethylglycinophenolsulfonate, Sodium Trimetaphosphate, TEA-EDTA, TEA-Polyphosphate, Tetrahydroxyethyl Ethylenediamine, Tetrahydroxypropyl Ethylenediamine, Tetrapotassium Etidronate, Tetrapotassium Pyrophosphate, Tetrasodium EDTA, Tetrasodium Etidronate, Tetrasodium Pyrophosphate, Tripotassium EDTA, Trisodium Dicarboxymethyl Alaninate, Trisodium EDTA, Trisodium HEDTA, Trisodium NTA and Trisodium Phosphate.

The proportion of component Z5) in the detergent composition, if it is not 0%, is preferably from 0.1% to 10% by weight, more preferably from 0.1% to 3.0% by weight and especially preferably from 0.1% to 1.0% by weight, based in each case on the total weight of the detergent composition.

Component Z6)

Suitable water-soluble solvents are known to those skilled in the art and are described by way of example in US 2005/0239674. Preference is given to using alcohols, glycerol, glycols and glycol ethers, preferably lower alcohols such as ethanol, isopropanol, butanol, isobutanol, or alkylene glycols, e.g. propylene glycol, and also glycol ethers, e.g. ethylene glycol n-butyl ether or propylene glycol n-butyl ether.

In a preferred embodiment, mixtures of two or more solvents are used.

The proportion of component Z6) in the detergent composition, if it is not 0%, is preferably from 0.1% to 10% by weight, more preferably from 0.1% to 3% by weight and especially preferably from 0.5% to 1.5% by weight, based on the total weight of the detergent composition.

Component Z7)

Suitable additives are further customary ingredients of detergents, for example disinfectants, pH modifiers, dyes, fragrances, buffers, viscosity regulators, corrosion inhibitors, organic and inorganic salts, optical brighteners, bleaches, antioxidants, opacifiers, hydrotropes, abrasives, preservatives, oxidizing agents and/or insecticides. These additives are sufficiently well known to those skilled in the art and are described by way of example in DE-A-10 2009 001 559.

According to the invention, it is possible to add bleaches to the detergent composition. Suitable bleaches include peroxides, peracids and/or perborates, particular preference being given to $H_2O_2$.

The detergent compositions may also comprise enzymes, preferably proteases, lipases, amylases, hydrolases and/or cellulases. They can be added to the detergent compositions in any form established in the prior art. In the case of detergent compositions in liquid or gel form, these especially include solutions of the enzymes, advantageously in maximum concentration, with a low water level and/or with added stabilizers. Alternatively, the enzymes can be encapsulated, for example by spray-drying or extrusion of the enzyme solution together with a preferably natural polymer or in the form of capsules, for example those in which the enzymes are enclosed in a solidified gel or in those of the core-shell type in which an enzyme-containing core has been coated with a water-, air- and/or chemical-impervious protective layer. In coating layers, it is additionally possible to apply further active ingredients, for example stabilizers, emulsifiers, pigments, bleaches or dyes. Capsules of this kind are applied by methods known per se, for example by agitated or roller granulation or in fluidized bed processes. Advantageously, granules of this kind have a low dust level, for example through application of polymeric film formers, and are storage-stable on account of the coating.

In addition, it is possible for enzyme stabilizers to be present in enzyme-containing detergent compositions, in order to protect any enzyme present in a detergent composition from damage, for example inactivation, denaturation or breakdown, for instance as a result of physical effects, oxidation or proteolytic cleavage. Suitable enzyme stabilizers, depending in each case on the enzyme used, are especially: benzamidine hydrochloride, borax, boric acids, boronic acids or the salts or esters thereof, in particular derivatives having aromatic groups, for instance substituted phenylboronic acids or the salts or esters thereof; peptide aldehydes (digopeptides with a reduced C terminus), amino alcohols such as mono-, di-, triethanol- and -propanolamine and mixtures thereof, aliphatic carboxylic acids up to $C_{12}$, such as succinic acid, other dicarboxylic acids or salts of the acids mentioned; and end group-capped fatty acid amide alkoxylates; lower aliphatic alcohols and in particular polyols, for example glycerol, ethylene glycol, propylene glycol or sorbitol; and reducing agents and antioxidants such as sodium sulfite and reducing sugars. Further suitable stabilizers are known from the prior art.

Preference is given to using combinations of stabilizers, for example the combination of polyols, boric acid and/or borax, the combination of boric acid or borate, reducing salts and succinic acid or other dicarboxylic acids, or the combination of boric acid or borate with polyols or polyamino compounds and with reducing salts.

Disinfectants and/or preservatives suitable in accordance with the invention are, for example, active antimicrobial ingredients from the groups of the alcohols, aldehydes, antimicrobial acids and salts thereof, carboxylic esters, acid amides, phenols, phenol derivatives, diphenyls, diphenylalkanes, urea derivatives, oxygen and nitrogen acetals and formals, benzamidines, isothiazoles and derivatives thereof such as isothiazolines and isothiazolinones, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butyl carbamate, iodine, iodophors and peroxides. Preferred active antimicrobial ingredients are preferably selected from the group comprising ethanol, n-propanol, i-propanol, butane-1,3-diol, phenoxyethanol, 1,2-propylene glycol, glycerol, undecylenoic acid, citric acid, lactic acid, benzoic acid, salicylic acid, thymol, 2-benzyl-4-chlorophenol, 2,2'-methylenebis(6-bromo-4-chlorophenol), 2,4,4'-trichloro-2'-hydroxydiphenyl ether, N-(4-chlorophenyl)-N-(3,4-dichlorophenyl)urea, N,N'-(1,10-decanediyldi-1-pyridinyl-4-ylidene)bis(1-octanamine) dihydrochloride, N,N'-bis(4-chlorophenyl)-3,12-diimino-2,4,11,13-tetraazatetradecanediimide amide, antimicrobial quaternary surface-active compounds, guanidines. Preferred antimicrobial surface-active quaternary compounds contain an ammonium, sulfonium, phosphonium, iodonium or arsonium group, as described, for example, by K. H. Wallhäusser in "Praxis der Sterilisation, Desinfektion—Konservierung: Keimidentifizierung—Betriebshygiene" [Practical Sterilization, Disinfection—Preservation: Microbe Identification—Commercial Hygiene] (5th edition—Stuttgart; New York: Thieme, 1995).

In the context of the invention, the terms "disinfection", "sanitation", "antimicrobial action" and "active antimicrobial ingredient" have the meaning customary in the art, as reflected, for example, by K. H. Wallhäusser in "Praxis der Sterilisation, Desinfektion—Konservierung: Keimidentifizierung—Betriebshygiene" (5th edition—Stuttgart; New York: Thieme, 1995). While disinfection in the narrower sense of medical practice means the killing of theoretically all infection germs, sanitation is the maximum elimination of all germs—including the saprophytic germs that are normally harmless to man.

The polyacrylic and polymethacrylic compounds include, for example, the high molecular weight copolymers of acrylic acid that have been crosslinked with a polyalkenyl polyether, especially an allyl ether of sucrose, pentaerythritol or propylene (INCI name according to International Dictionary of Cosmetic Ingredients from The Cosmetic, Toiletry, and Fragrance Association (CTFA): Carbomer), which are also referred to as carboxyvinyl polymers. Polyacrylic acids of this kind are available, inter alia, from 3V Sigma under the Polygel® trade name, e.g. Polygel® DA, and from BF Goodrich under the Carbopol® trade name, e.g. Carbopol® 940 (molecular weight about 4 000 000), Carbopol® 941 (molecular weight about 1 250 000) or Carbopol® 934 (molecular weight about 3 000 000). In addition, these also include the following acrylic acid copolymers:

(i) copolymers of two or more monomers from the group of acrylic acid, methacrylic acid and the simple esters thereof, preferably formed with $C_{1-4}$-alkanols (INCI Acrylates Copolymer), which include, for instance, the copolymers of methacrylic acid, butyl acrylate and methyl methacrylate (CAS designation according to Chemical Abstracts Service: 25035-69-2) or of butyl acrylate and methyl methacrylate (CAS 25852-37-3), and which are available, for example, from Rohm & Haas under the Aculyn® and Acusol® trade names and from Degussa (Goldschmidt) under the Tego® Polymer trade name, for example the anionic nonassociative polymers Aculyn® 22, Aculyn® 28, Aculyn® 33 (crosslinked), Acusol® 810, Acusol® 823 and Acusol® 830 (CAS 25852-37-3);

(ii) crosslinked high molecular weight acrylic acid copolymers, which include, for instance, the copolymers of $C_{10-30}$-alkyl acrylates that have been crosslinked with an allyl ether of sucrose or pentaerythritol and have one or more monomers from the group of acrylic acid, methacrylic acid and the simple esters thereof, preferably formed with $C_1$-$C_4$-alkanols (INCI Acrylates/$C_{10}$-$C_{30}$ Alkyl Acrylate Crosspolymer), and which are available, for example, from BF Goodrich under the Carbopol® trade name, for example the hydrophobized Carbopol® ETD 2623 and Carbopol® 1382 (INCI Acrylates/$C_{10-30}$ Alkyl Acrylate Crosspolymer) and Carbopol® AQUA 30 (formerly Carbopol® EX 473).

Further thickeners are the polysaccharides and heteropolysaccharides, especially the polysaccharide gums, for example, gum arabic, agar, alginates, carrageenans and salts thereof, guar, guaran, tragacanth, gellan, ramsan, dextran or xanthan and derivatives thereof, e.g. propoxylated guar, and mixtures thereof. Other polysaccharide thickeners, such as starches or cellulose derivatives, can be used as an alternative to, but preferably in addition to, a polysaccharide gum, for example starches from a wide variety of different origins and starch derivatives, e.g. hydroxyethyl starch, starch phosphate esters or starch acetates, or carboxymethyl cellulose or the sodium salt thereof, methyl cellulose, ethyl cellulose, hydroxyethyl cellulose, hydroxypropyl cellulose, hydroxypropyl methyl cellulose or hydroxyethyl methyl cellulose or cellulose acetate.

A particularly preferred polysaccharide thickener is the microbial anionic heteropolysaccharide xanthan gum, which is produced by *Xanthomonas campestris* and some other species under aerobic conditions with a molecular weight of 2-15×10$^6$ and is available, for example, from Kelco under the Keltrol® and Kelzan® trade names or else from Rhodia under the Rhodopol® trade name.

Thickeners used may also be sheet silicates. These include, for example, the magnesium or sodium-magnesium sheet silicates available under the Laponite® trade name from Solvay Alkali, especially Laponite® RD or else Laponite® RDS, and the magnesium silicates from Sid-Chemie, in particular Optigel® SH.

The amount of viscosity regulator, if it is not 0%, is preferably up to 0.5% by weight, more preferably from 0.001% to 0.3% by weight, especially preferably from 0.01% to 0.2% by weight and exceptionally preferably from 0.01% to 0.15% by weight, based in each case on the total weight of the detergent composition. The viscosity of the detergent compositions is preferably from 0.4 to 400 m*Pas.

In addition, the detergent compositions may comprise one or more corrosion inhibitors.

Suitable corrosion inhibitors (INCI Corrosion Inhibitors) are, for example, the following substances named according to INCI: Cyclohexylamine, Diammonium Phosphate, Dilithium Oxalate, Dimethylamino Methylpropanol, Dipotassium Oxalate, Dipotassium Phosphate, Disodium Phosphate, Disodium Pyrophosphate, Disodium Tetrapropenyl Succinate, Hexoxyethyl Diethylammonium, Phosphate, Nitromethane, Potassium Silicate, Sodium Aluminate, Sodium Hexametaphosphate, Sodium Metasilicate, Sodium Molybdate, Sodium Nitrite, Sodium Oxalate, Sodium Silicate, Stearamidopropyl Dimethicone, Tetrapotassium Pyrophosphate, Tetrasodium Pyrophosphate and Triisopropanolamine.

Fragrances which may be used are individual odorant compounds, e.g. the synthetic products of the ester, ether, aldehyde, ketone, alcohol and hydrocarbon types. Odorant compounds of the ester type are, for example, benzyl acetate, phenoxyethyl isobutyrate, p-tert-butylcyclohexyl acetate, linalyl acetate, dimethylbenzylcarbinyl acetate, phenylethyl acetate, linalyl benzoate, benzyl formate, ethylmethylphenyl glycinate, allyl cyclohexyl propionate, styrallyl propionate and benzyl salicylate. The ethers include, for example, benzyl ethyl ethers, the aldehydes include, for example, the linear alkanals having 8 to 18 carbon atoms, citral, citronellal, citronellyloxyacetaldehyde, hydroxycitronellal, lilial and bourgeonal, the ketones include, for example, the ionones, alpha-isomethylionone and methyl cedryl ketone, the alcohols include anethol, citronellol, eugenol, geraniol, linalool, phenylethyl alcohol and terpineol, and the hydrocarbons include primarily the terpenes and balsams. Preference is given to using mixtures of different odorants which together produce a pleasing scent note.

Fragrances used may also be natural odorant mixtures, as obtainable from vegetable or animal sources, e.g. pine oil, citrus oil, jasmine oil, lily oil, rose oil or ylang-ylang oil. Essential oils of relatively low volatility, which in most cases are used as aromatic components, are also suitable as perfume oils, e.g. sage oil, chamomile oil, clove oil, melissa oil, mint oil, cinnamon leaf oil, linden blossom oil, juniper berry oil, vetiver oil, olibanum oil, galbanum oil and ladanum oil.

The amount of the fragrances in the detergent compositions, if it is not 0%, is preferably from 0.001% to 2% by weight and more preferably from 0.01% to 2% by weight, based in each case on the total weight of the detergent compositions.

Any dyes and pigments present in the detergent compositions, either organic or inorganic dyes, may be selected from the corresponding positive list from the Cosmetics Directive or the EU list of cosmetic colorants. Also advantageously used are pearlescent pigments, e.g. pearl essence (mixed guanine/hypoxanthine crystals from fish scales) and mother of pearl (ground seashells), monocrystalline pearlescent pigments, for example bismuth oxychloride (BiOCl), layer-substrate pigments, e.g. mica/metal oxide, silver-white pearlescent pigments composed of $TiO_2$, interference pigments ($TiO_2$, different layer thickness), color luster pigments ($Fe_2O_3$) and combination pigments ($TiO_2/Fe_2O_3$, $TiO_2/Cr_2O_3$, $TiO_2$/Prussian blue, $TiO_2$/carmine).

The amount of the dyes and pigments in the detergent compositions, if it is not 0%, is preferably from 0.01% to 1.0% by weight, based on the total weight of the detergent compositions.

The proportion of component Z7) in the detergent compositions, if it is not 0%, is preferably from 0.01% to 10% by weight, more preferably from 0.1% to 1% by weight and especially preferably from 0.1% to 0.5% by weight, based in each case on the total weight of the detergent compositions.

The detergent compositions preferably comprise
Z1) 0.005% to 10.00% by weight of component Z1),
Z2) 0.10% to 20.00% by weight of component Z2),
Z3) 10.00% to 99.8% by weight of component Z3),
Z4) 0% to 10% by weight of component Z4),
Z5) 0% to 10% by weight of component Z5),
Z6) 0% to 10% by weight of component Z6), and
Z7) 0% to 10% by weight of component Z7),
based in each case on the total weight of the detergent compositions.

The present invention also further provides the detergent compositions comprising one or more copolymers of the invention.

The copolymers of the invention and the detergent compositions of the invention are advantageously suitable for producing shine on hard surfaces, preferably on hard surfaces of plastic, ceramic, stone, for example natural stone, porcelain, glass, wood, linoleum or metal, for example stainless steel.

The present invention therefore further provides for the use of one or more copolymers of the invention, preferably in a detergent composition of the invention, or of a detergent composition of the invention for producing shine on hard surfaces, preferably on hard surfaces of plastic, ceramic, stone, for example natural stone, porcelain, glass, wood, linoleum or metal, for example stainless steel.

The copolymers of the invention and the detergent compositions of the invention are additionally advantageously suitable for hydrophilization of hard surfaces, preferably of hard surfaces of plastic, ceramic, stone, for example natural stone, porcelain, glass, wood, linoleum or metal, for example stainless steel.

The present invention therefore further provides for the use of one or more copolymers of the invention, preferably in a detergent composition of the invention, or of a detergent composition of the invention for hydrophilization of a hard surface, preferably of a hard surface of plastic, ceramic, stone, for example natural stone, porcelain, glass, wood, linoleum or metal, for example stainless steel.

The copolymers of the invention and the detergent compositions of the invention are further advantageously suitable for achieving a repair effect on hard surfaces, preferably on hard surfaces of plastic, ceramic, stone, for example natural stone, porcelain, glass, wood, linoleum or metal, for example stainless steel.

The present invention therefore further provides for the use of one or more copolymers of the invention, preferably in a detergent composition of the invention, or of a detergent composition of the invention for achieving a repair effect on a hard surface, preferably on a hard surface of plastic, ceramic, stone, for example natural stone, porcelain, glass, wood, linoleum or metal, for example stainless steel.

The preferred embodiments specified above for the copolymers of the invention also apply correspondingly to the detergent compositions of the invention and to the inventive use of the copolymers of the invention or the detergent compositions of the invention, especially for producing shine on hard surfaces, for hydrophilization of hard surfaces and for achievement of a repair effect on hard surfaces.

The invention is elucidated in detail by examples hereinafter, without restricting it thereto. Unless explicitly stated otherwise in the examples, percentages in the examples should be understood as percent by weight (% by weight).

EXAMPLES

The following abbreviations are used:

| | |
|---|---|
| AAPTAC | [3-(acryloylamino)propyl]trimethylammonium chloride (75% by weight active in aqueous solution) |
| DADMAC | diallyldimethylammonium chloride (65% by weight active in aqueous solution) |
| DMAA | N,N-dimethylacrylamide (100% active) |
| MAPTAC | [3-(methacryloylamino)propyl]trimethylammonium chloride (50% by weight active in aqueous solution) |
| MESNA | sodium 2-mercaptoethanesulfonate (100% active) |
| Meth 5000 | polyethylene glycol-co-polypropylene glycol methacrylate 5000 g/mol, 4-5 propylene glycol units (50% by weight active in aqueous solution) |
| MA Na salt | maleic acid, sodium salt (100% active) |
| NIPAM | N-isopropylacrylamide (100% active) |
| NVP | N-vinylpyrrolidone (100% active) |
| VA-44 | 2,2'-azobis[2-(2-imidazolin-2-yl)propane] dihydrochloride (100% active) |
| V-PEG 5000 | polyethylene glycol vinyloxybutyl ether 5000 g/mol (100% active) |

Preparation of the Copolymers of the Invention

General method for preparation of the copolymers of the invention: In a multineck flask equipped with a precision glass stirrer, reflux condenser and $N_2$ connection, under nitrogen (5 liters/hour), for the examples cited in table 1 for preparation of copolymers of the invention, the stated amounts of chemicals (excluding the initiator) are dissolved in the stated amount of distilled water. It should be noted that some of the substances used for preparation of the copolymers of the invention are used in aqueous form (see the details given for the substances used for the preparation of the copolymers of the invention). The distilled water specified in table 1 is added in addition to the water introduced via these substances. In the case of acidic monomers, these are pre-neutralized with base, for example alkali metal carbonate, e.g. potassium carbonate. Subsequently, the aqueous solution is purged with nitrogen for 30 minutes and heated to 60° C. In the next step, the amount of initiator specified in table 1 (VA-44) is dissolved in 10 g of distilled water and metered in over a period of 90 minutes. After the metered addition has ended, stirring is continued at an internal temperature of 60° C. for a further hour. The conversion of the reaction is checked by a subsequent analysis of the solids, and any unconverted monomers, if necessary, are reacted via a small addition of a 10% by weight aqueous solution of the initiator already used beforehand until full conversion has been attained. Thereafter, the reaction mixture is cooled down to room temperature (20-23° C.).

Table 1 lists synthesis examples of copolymers of the invention.

TABLE 1

Substances used for preparation of the copolymers

| Co-polymer No. | V-PEG 5000 [mmol] | Meth 5000 [mmol] | AAPTAC [mmol] | NIPAM [mmol] | DMAA [mmol] | DADMAC [mmol] | MAPTAC [mmol] | NVP [mmol] | MA Na salt [mmol] | Na hypo-phosphite [g] | MESNA [g] | VA-44 [g] | dist. $H_2O$ [g] | Mw [g/mol] |
|---|---|---|---|---|---|---|---|---|---|---|---|---|---|---|
| 1 | 4.816 | — | 32.985 | 80.064 | — | — | — | — | — | 0.120 | — | 1.560 | 149.450 | 39284 |
| 2 | 4.816 | — | 32.985 | — | 91.395 | — | — | — | — | 0.120 | — | 1.560 | 149.450 | |
| 3 | 4.816 | — | — | 22.899 | 83.755 | — | — | — | — | — | — | 1.560 | 142.250 | |
| 6 | 4.816 | — | — | — | 57.198 | — | 46.163 | — | — | — | — | 1.560 | 139.500 | |
| 7 | 4.816 | — | — | 80.064 | — | — | 30.760 | — | — | 0.120 | — | 1.560 | 144.860 | 35849 |
| 11 | 4.816 | — | — | 80.064 | — | — | 30.760 | — | — | — | — | 1.560 | 724.300 | 118920 |
| 16 | — | 6.875 | 15.146 | 69.017 | — | — | — | 154.580 | — | — | 0.540 | 1.560 | 142.100 | |
| 18 | — | 6.874 | 30.328 | 55.232 | — | — | — | 140.543 | — | — | 0.540 | 1.560 | 141.060 | |

TABLE 1-continued

Substances used for preparation of the copolymers

| Co-polymer No. | V-PEG 5000 [mmol] | Meth 5000 [mmol] | AAPTAC [mmol] | NIPAM [mmol] | DMAA [mmol] | DADMAC [mmol] | MAPTAC [mmol] | NVP [mmol] | MA Na salt [mmol] | Na hypophosphite [g] | MESNA [g] | VA-44 [g] | dist. H$_2$O [g] | Mw [g/mol] |
|---|---|---|---|---|---|---|---|---|---|---|---|---|---|---|
| 19 | — | 4.816 | — | 80.064 | — | 42.015 | — | — | — | — | 0.180 | 1.560 | 99.070 | |
| 20 | — | 4.816 | — | 80.064 | — | 42.015 | — | — | — | — | 0.360 | 1.560 | 99.070 | |
| 21 | — | 4.816 | — | 80.064 | — | 42.015 | — | — | — | — | 0.540 | 1.560 | 99.070 | |
| 22 | 4.816 | — | — | — | 91.395 | — | 30.760 | — | — | 0.120 | — | 1.560 | 149.450 | |
| 23 | 4.816 | — | — | — | 91.395 | — | 30.760 | — | 1.090 | — | — | 1.560 | 149.450 | |

The amounts stated in table 1 are based on the active substance.

TABLE 1A

Relative amounts according to table 1

| Copolymer No. | Total amount of the monomers used [mmol] | Structural units (A) [mol %] | Structural units (B) [mol %] | Structural units (C) [mol %] | Structural units (D) [mol %] |
|---|---|---|---|---|---|
| 1 | 117.865 | 28.0 | 4.1 | 67.9 | — |
| 2 | 129.196 | 25.5 | 3.7 | 70.7 | — |
| 3 | 111.470 | 75.1 | 4.3 | 20.5 | — |
| 6 | 108.177 | 42.7 | 4.5 | 52.9 | — |
| 7 | 115.640 | 26.6 | 4.2 | 69.2 | — |
| 11 | 115.640 | 26.6 | 4.2 | 69.2 | — |
| 16 | 245.618 | 6.2 | 2.8 | 91.0 | — |
| 18 | 232.977 | 13.0 | 3.0 | 84.0 | — |
| 19 | 126.895 | 33.1 | 3.8 | 63.1 | — |
| 20 | 126.895 | 33.1 | 3.8 | 63.1 | — |
| 21 | 126.895 | 33.1 | 3.8 | 63.1 | — |
| 22 | 126.971 | 24.2 | 3.8 | 72.0 | — |
| 23 | 128.061 | 24.0 | 3.8 | 71.4 | 0.9 |

Determination of the Weight-Average Molecular Weights $M_w$ by GPC:
Method Description:

| | |
|---|---|
| Column: | PSS NOVEMA MAX Guard, 1 × 30 Å & 2 × 1000 Å 10 μm, 300 mm × 8 mm |
| Detector: | RI |
| Oven temperature: | 25° C. |
| Flow rate: | 1 mL/minute |
| Injection volume: | 50 μL |
| Eluent: | 79.7% by vol. of 0.1M NaCl + 0.3% by vol. of TFA (trifluoroacetic acid) + 20.0% by vol. of ACN (acetonitrile) |
| Calibration method: | conventional calibration |
| Standards: | poly(2-vinylpyridine) in the range from 1110 to 1 060 000 daltons |

Measured weight-average molecular weights $M_w$ for copolymers of the invention are reported in table 1.

Shining Capacity

Black, shiny ceramic tiles (10×10 cm) are subjected to preliminary cleaning and then about 10 drops of the detergent composition are applied to the middle of the tiles. The detergent composition is distributed homogeneously on the tile with the aid of a folded cellulose kitchen towel. Once the tiles have dried vertically for at least 30 minutes, a visual assessment of the tiles is made with grades from 1 to 10, with 1 being the best and 10 the worst grade.

Example formulations were produced with and without copolymer of the invention and these formulations were used to conduct shine tests. The example formulations and shine results are shown in table 2.

TABLE 2

Example formulations and shine results

| Cleaning product | A | B | C | D | E | F | G | H |
|---|---|---|---|---|---|---|---|---|
| C11 alcohol ethoxylate [% by wt.] | 4.0 | 2.5 | 4.5 | 4.0 | 2.5 | 4.5 | 1.0 | — |
| Propylene glycol butyl ether [% by wt.] | 1.0 | 0.6 | 0.5 | 1.0 | 0.6 | 0.5 | — | — |
| Alkyl polyglucoside [% by wt.] | — | 1.0 | — | — | 1.0 | — | — | — |
| Sodium alkylbenzenesulfonate [% by wt.] | — | — | — | — | — | — | 2.0 | 0.5 |
| Lactic acid [% by wt.] | — | — | — | — | — | — | 1.5 | — |
| Dipropylene glycol monobutyl ether [% by wt.] | — | — | — | — | — | — | — | 0.25 |
| Ammonium hydroxide [% by wt.] | — | — | — | — | — | — | — | 0.3 |
| Benzalkonium chloride [% by wt.] | — | 0.4 | — | — | 0.4 | — | — | — |
| Isopropanol [% by wt.] | — | — | — | — | — | — | — | 7.0 |
| Water [% by wt.] | ad 100 | ad 100 | ad 100 | ad 100 | ad 100 | ad 100 | ad 100 | ad 100 |
| pH (adjusted with NaOH or citric acid) | 7 | 7 | 7 | 10 | 10 | 10 | 3.4 | 11.3 |

TABLE 2-continued

Example formulations and shine results

| Cleaning product | A | B | C | D | E | F | G | H |
|---|---|---|---|---|---|---|---|---|
| Visual assessment | | | | | | | | |
| No additive | 6.3 | 2.5 | 10.0 | 9.2 | 3.0 | 10.0 | 10.0 | 7.0 |
| +0.2% by wt. of copolymer 1 | 2.0 | 2.0 | 2.0 | 1.7 | 2.0 | 2.0 | | |
| +0.2% by wt. of copolymer 2 | 2.0 | | | 2.7 | | | | |
| +0.2% by wt. of copolymer 3 | 3.3 | | | 2.3 | | | | 1.3 |
| +0.2% by wt. of copolymer 6 | | | | | | | 3.7 | 2.0 |

The results in table 2 show that the use of the copolymers of the invention in the example formulations can achieve better shine results compared to the corresponding example formulations without copolymer of the invention.

Copolymers of the invention were added to commercially available cleaning products, and shine tests were conducted with the commercially available cleaning products with and without copolymer. The results are shown in table 3.

TABLE 3

Use of copolymers in commercially available cleaning products

| Cleaning product | Commercially available cleaning product 1 All-purpose cleaning spray | Commercially available cleaning product 2 Bathroom cleaning spray | Commercially available cleaning product 3 Cleaning spray |
|---|---|---|---|
| pH | 11 | 2.9 | 2.5 |
| No additive | 10 | 6.3 | 5.3 |
| +0.2% by weight of copolymer 6 | 2.0 | 1.0 | 1.0 |
| +0.2% by weight of copolymer 3 | 2.0 | 1.0 | 2.7 |

Table 3 shows that the use of the copolymers of the invention in commercially available cleaning products can achieve better shine results compared to the corresponding commercially available cleaning products without addition of a copolymer of the invention.

Adsorption Tests on Hard Surfaces

The tests were effected with the QCM-D Quartz Microbalance with Dissipation Monitoring, Q-Sense, Västra Frölinda, Sweden. The method is based on the change in the intrinsic frequency of a piezoelectric quartz crystal as soon as it is loaded with a mass. The surface of the crystal may be modified by spin-coating or vapor deposition. The crystal oscillator is within a test cell. The test cell used is a flow cell into which the solution to be examined is pumped from reservoir vessels. The pumping rate is kept constant during the measurement time. Typical pumping rates are between 50-250 µL/minute. During a measurement, it should be ensured that the hoses and test cell are free of air bubbles. Each measurement begins with the recording of the baseline, which is set as the zero point for all frequency and dissipation measurements.

In this example, commercially available crystal oscillators having a 50 nm-thick silicon dioxide coating (QSX303, Q-Sense, Västra Frölinda, Sweden) and crystal oscillators having a 50 nm-thick stainless steel (SS2343) coating (QSX304, Q-Sense, Västra Frölinda, Sweden) were used.

Aqueous solutions of the copolymers of the invention with an active content of 2000 ppm were examined. The water used was tapwater of 20° dH (German hardness). The pH was adjusted to pH 10 with NaOH or citric acid.

TABLE 4

Adsorption of the copolymers on silica

| Copolymer No. | Mass adsorbed [ng/cm$^2$] |
|---|---|
| 6 | 355.8 |
| 3 | 142.5 |
| 7 | 348.0 |
| 22 | 102.7 |
| 23 | 330.4 |

TABLE 5

Adsorption of the copolymers on stainless steel

| Copolymer No. | Mass adsorbed [ng/cm$^2$] |
|---|---|
| 22 | 121.0 |
| 23 | 156.6 |

The results of tables 4 and 5 show that the copolymers of the invention are suitable for use on hard surfaces, since these are adsorbed on the inorganic surfaces examined.

Contact Angle Test

The contact angles were measured on various surfaces (ceramic, glass, stainless steel) by modifying the surfaces by the following method: The surfaces were immersed three times into fresh demineralized water (DM water) for 2 minutes and then, for modification, immersed into the particular aqueous copolymer solution at room temperature while stirring for 20 minutes. Thereafter, the surfaces were dried with a gentle nitrogen stream. The contact angle was measured on the surfaces thus prepared with DM water (apparatus: DSA 100 droplet analyzer from Krüss, Hamburg).

The magnitude of the contact angle of a water droplet on a surface is a measure of the hydrophilization thereof. A very hydrophilic surface is fully wetted by a water droplet. This phenomenon is also referred to as spreading of the droplet.

Copolymers of the invention were examined in the form of an aqueous solution having an active content of 2000 ppm. The water used was tapwater of 20° dH (German hardness). The pH was adjusted to pH 10 with NaOH or citric acid.

TABLE 6

Contact angle on black ceramic tiles

| Copolymer No. | Contact angle of water |
|---|---|
| Untreated | 18° |
| 6 | 4.2° |
| 3 | 15° |
| 7 | 5° |

TABLE 6-continued

Contact angle on black ceramic tiles

| Copolymer No. | Contact angle of water |
|---|---|
| 22 | droplet spreads |
| 23 | droplet spreads |

TABLE 7

Contact angle on glass

| Copolymer No. | Contact angle of water |
|---|---|
| Untreated | 39° |
| 6 | droplet spreads |
| 3 | droplet spreads |
| 7 | droplet spreads |

TABLE 8

Contact angle on steel

| Copolymer No. | Contact angle of water |
|---|---|
| untreated | 15° |
| 22 | 8° |
| 23 | 13° |

The results from tables 6, 7 and 8 show that the copolymers of the invention are suitable for reducing the contact angle of water on inorganic surfaces (i.e. suitable for hydrophilizing inorganic surfaces).

Repair Effect

The topography of the surface of a damaged black tile was determined before and after treatment with aqueous solutions of the copolymers of the invention having an active content of 2000 ppm (apparatus: contactless optical 3D surface characterization system from Sensofar, Barcelona, model: S neox). With the aid of the MountainsMap software (Digital Surf SARL, Besancon, France), by segmentation of the topography of a surface into area elements, various 3D indices can be calculated. These parameters give information about aspects including height information (calculation effected according to ISO 25178) and roughness (calculation effected according to ISO 4287).

TABLE 9

Roughness of a black damaged tile before and after copolymer treatment

| Copolymer No. | Roughness untreated [nm] | Roughness after treatment [nm] |
|---|---|---|
| 6 | 140 | 94.6 |
| 3 | 110 | 108 |
| 7 | 86 | 85 |

\* Change in the roughness of a black tile

The studies clearly show the repair effect of the copolymers of the invention.

The invention claimed is:

1. A copolymer containing
a) 15.0 to 84.5 mol % of at least one cationic structural unit (A),
b) 1.0 to 4.5 mol % of at least one macromonomeric structural unit (B), and
c) at least one structural unit (C), other than the structural units (A) and (B), wherein the at least one cationic structural unit (A) is represented by the following formula (I):

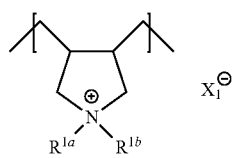

in which
$R^{1a}$ is hydrogen or a methyl radical,
$R^{1b}$ is hydrogen, an aliphatic hydrocarbyl radical having 1 to 20 carbon atoms, a cycloaliphatic hydrocarbyl radical having 5 to 20 carbon atoms, an aryl radical having 6 to 14 carbon atoms or polyethylene glycol (PEG), and
$X_1$ is a halogen atom, $C_1$- to $C_4$-alkylsulfate or $C_1$- to $C_4$-alkylsulfonate,
the at least one macromonomeric structural unit (B) is represented by the formula (III):

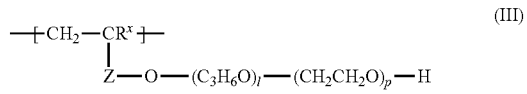

in which
$R^x$ is the same or different and is represented by H and/or methyl,
Z is $O(CH_2)_4$,
l on molar average is a number from 0 to 7, and
p on molar average is a number from 1 to 150,
and
the at least one structural unit (C) is/are the polymerization product of at least one monomer species selected from the group consisting of noncationic acrylamides, noncationic methacrylamides and N-vinyl-substituted lactams having 5 to 7 ring atoms.

2. The copolymer as claimed in claim 1, wherein the at least one structural unit (A) is the polymerization product of diallyldimethylammonium chloride (DADMAC).

3. The copolymer as claimed in claim 1, wherein the at least one macromonomeric structural unit (B) of the formula (III) is the polymerization product of at least one monomer species selected from the group consisting of polyethylene glycol vinyloxybutyl ether, polyethylene glycol-co-polypropylene glycol vinyloxybutyl ether in which l on molar average is a number from 1 to 7.

4. The copolymer as claimed in claim 1, wherein, in the at least one macromonomeric structural unit of the formula (III), $R^x$ is H, l=0 and p on molar average is a number from 1 to 150.

5. The copolymer as claimed in claim 1, which contains 0.1 to 74.0 mol % of at least one structural unit (C) other than the structural units (A) and (B).

6. The copolymer as claimed in claim 1, which contains the at least one cationic structural unit (A) in proportions of 23.0 to 79.0 mol %, the at least one macromonomeric structural unit (B) in proportions of 1.0 to 4.4 mol %, and the at least one structural unit (C) in proportions of 20.0 to 74.0 mol %.

7. The copolymer as claimed in claim 1, wherein the at least one structural unit (C) is/are selected from the group consisting of the polymerization product of at least one N-vinyl-substituted lactam having 5 to 7 ring atoms and the structural units of the following formulae (IV) and/or (V):

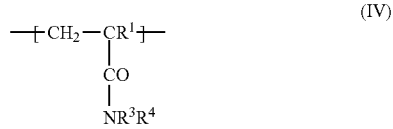
(IV)

in which

R$^1$ is the same or different and is hydrogen and/or methyl, and

R$^3$ and R$^4$ are each the same or different and are each independently represented by hydrogen, an aliphatic hydrocarbyl radical having 1 to 20 carbon atoms, a cycloaliphatic hydrocarbyl radical having 5 to 20 carbon atoms, an aryl radical having 6 to 14 carbon atoms, an alkylaryl radical having 7 to 14 carbon atoms, a branched or unbranched C$_1$-C$_5$-monohydroxyalkyl group and/or polyethylene glycol (PEG),

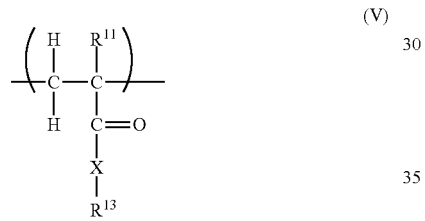
(V)

in which

R$^{11}$ is the same or different and is represented by H and/or methyl;

X is the same or different and is represented by NH—(C$_n$H$_{2n}$) with n=1, 2, 3 or 4; and R$^{13}$ is the same or different and is represented by OH, SO$_3$H, PO$_3$H$_2$, O—PO$_3$H$_2$ and/or para-substituted C$_6$H$_4$—SO$_3$H.

8. The copolymer as claimed in claim 7, wherein the at least one structural unit (C) is/are selected from the structural units of the formula (IV).

9. The copolymer as claimed in claim 1, wherein the at least one structural unit (C) is/are the polymerization product of at least one monomer species selected from the group consisting of acrylamide, methacrylamide, N-methylacrylamide, N,N-dimethylacrylamide, N-ethylacrylamide, N-cyclohexylacrylamide, N-benzylacrylamide, N-methylolacrylamide, N-isopropylacrylamide and N-tert-butylacrylamide.

10. The copolymer as claimed in claim 1, which contains, in addition to the structural units (A), (B) and (C), at least one structural unit (D) other than the structural units (A), (B) and (C).

11. The copolymer as claimed in claim 10, which contains at least one structural unit (D) selected from the group consisting of the structural units of the following formulae (IX) and/or (X):

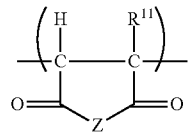
(IX)

in which

R$^{11}$ is the same or different and is represented by H and/or methyl;

Z is the same or different and is represented by O and/or NH;

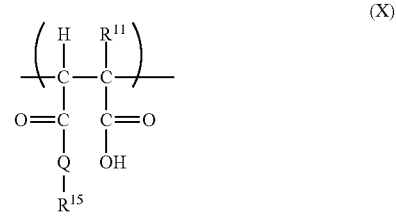
(X)

in which

R$^{11}$ is the same or different and is represented by H and/or methyl;

Q is the same or different and is represented by O and/or NH; and

R$^{15}$ is the same or different and is represented by H, (C$_n$H$_{2n}$)—SO$_3$H with n=0, 1, 2, 3 or 4; (C$_n$H$_{2n}$)—OH with n=0, 1, 2, 3 or 4; (C$_n$H$_{2n}$)—PO$_3$H$_2$ with n=0, 1, 2, 3 or 4; (C$_n$H$_{2n}$)—OPO$_3$H$_2$ with n=0, 1, 2, 3 or 4; (C$_6$H$_4$)—SO$_3$H; (C$_6$H$_4$)—PO$_3$H$_2$; (C$_6$H$_4$)—OPO$_3$H$_2$ and/or (C$_m$H$_{2m}$)$_e$—O-(A'O)$_u$—R$^{16}$ with m=0, 1, 2, 3 or 4, e=0, 1, 2, 3 or 4, A'=C$_x$H$_{2x'}$ with x'=2, 3, 4 or 5, u=an integer from 1 to 350 and R$^{16}$ is the same or different and is represented by an unbranched or branched C$_1$-C$_4$-alkyl group, where the structural units of the formula (X) may also be in salt form.

12. The copolymer as claimed in claim 1, wherein the structural units (A), (B) and (C) are present in the copolymer in a random, blockwise, alternating or gradient distribution.

13. The copolymer as claimed in claim 1, having a weight-average molecular weight M$_w$, determined by means of GPC with poly(2-vinylpyridine) as standard, of from 10 000 to 250 000 g/mol.

14. A detergent composition, which comprises at least one copolymer as claimed in claim 1.

15. A method for producing shine on hard surfaces, comprising the step of contacting the hard surface with at least one composition comprising at least one copolymer as claimed in claim 1.

16. A method comprising the step of contacting the hard surface with at least one composition comprising at least one copolymer as claimed in claim 1.

17. The copolymer as claimed in claim 10, wherein the structural units (A), (B), (C) and (D) are present in the copolymer in a random, blockwise, alternating or gradient distribution.

18. The copolymer as claimed in claim 8, wherein p is in the range of 12-150.

19. The copolymer as claimed in claim 18, wherein R$^{1b}$ is methyl.

20. A copolymer consisting of:
a) 15.0 to 84.5 mol % of at least one cationic structural unit (A),
b) 1.0 to 4.5 mol % of at least one macromonomeric structural unit (B), and
c) at least one structural unit (C), other than the structural units (A) and (B),
wherein the at least one cationic structural unit (A) is represented by the following formulae (I) and/or (II):

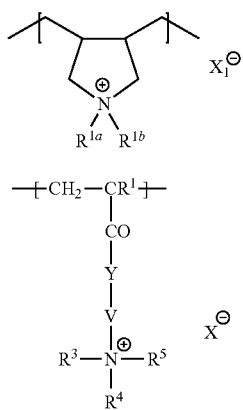

in which
R$^1$ and R$^{1a}$ are each the same or different and are each independently is hydrogen and/or a methyl radical,
R$^{1b}$, R$^3$, R$^4$ and R$^5$ are each the same or different and are each independently represented by hydrogen, an aliphatic hydrocarbyl radical having 1 to 20 carbon atoms, a cycloaliphatic hydrocarbyl radical having 5 to 20 carbon atoms, an aryl radical having 6 to 14 carbon atoms and/or polyethylene glycol (PEG),
Y is the same or different and is represented by oxygen, NH and/or NR$^3$,
V is the same or different and is represented by —(CH$_2$)$_x$—,

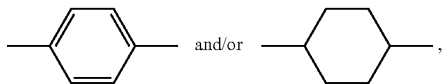

x is the same or different and is represented by an integer from 1 to 6, and
X and X$_1$ are each the same or different and are each independently represented by a halogen atom, C$_1$- to C$_4$-alkylsulfate and/or C$_1$ to C$_4$-alkylsulfonate,
the at least one macromonomeric structural unit (B) is represented by the formula (III):

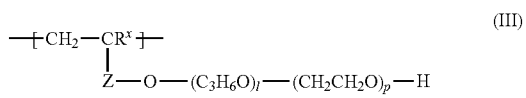

in which
R$^x$ is the same or different and is represented by H and/or methyl,
Z is O(CH$_2$)$_4$,
l on molar average is a number from 0 to 7, and
p on molar average is a number from 1 to 150, and
the at least one structural unit (C) is/are the polymerization product of at least one monomer species selected from the group consisting of noncationic acrylamides, noncationic methacrylamides and N-vinyl-substituted lactams having 5 to 7 ring atoms.

* * * * *